United States Patent
Ashizawa et al.

[11] Patent Number: 5,892,316
[45] Date of Patent: Apr. 6, 1999

[54] VIBRATION ACTUATOR

[75] Inventors: Takatoshi Ashizawa; Mitsuhiro Okazaki, both of Kawasaki; Isao Sugaya, Yokohama, all of Japan

[73] Assignee: Nikon Corporation, Tokyo, Japan

[21] Appl. No.: 927,062

[22] Filed: Sep. 10, 1997

Related U.S. Application Data

[63] Continuation of Ser. No. 715,471, Sep. 18, 1996, abandoned.

[30] Foreign Application Priority Data

| Sep. 19, 1995 | [JP] | Japan | 7-239603 |
| Jan. 24, 1996 | [JP] | Japan | 8-009824 |
| Feb. 13, 1996 | [JP] | Japan | 8-025575 |

[51] Int. Cl.$^6$ .................................................. H01L 41/08
[52] U.S. Cl. ............................................................ 310/323
[58] Field of Search .................................. 310/323, 325, 310/328, 333, 366, 321

[56] References Cited

U.S. PATENT DOCUMENTS

| 3,891,869 | 6/1975 | Scarpa | 310/325 |
| 4,220,886 | 9/1980 | Ciszewski et al. | 310/325 |
| 4,812,697 | 3/1989 | Mishiro | 310/333 X |
| 4,965,482 | 10/1990 | Ohnishi et al. | 310/325 X |
| 5,051,647 | 9/1991 | Uchikawa et al. | 310/323 |
| 5,115,161 | 5/1992 | Myohga et al. | 310/323 X |
| 5,122,700 | 6/1992 | Tamai et al. | 310/323 |
| 5,233,274 | 8/1993 | Honda et al. | 310/323 X |
| 5,319,278 | 6/1994 | Myohga et al. | 310/325 X |
| 5,543,879 | 8/1996 | Takagi | 310/323 X |

FOREIGN PATENT DOCUMENTS

| 0 674 350 A1 | 9/1995 | European Pat. Off. . |
| 0 696 072 A1 | 2/1996 | European Pat. Off. . |

*Primary Examiner*—Mark O. Budd

[57] ABSTRACT

A vibration actuator comprising a vibration element including an elastic member and an electromechanical converting element and a relative movement member maintained in pressure contact with a driving face of the vibration element, wherein the electromechanical converting element includes a longitudinal vibration generating electromechanical converting element for generating a longitudinal vibration for generating a displacement along the axial direction of the vibration element, and a torsional vibration generating electromechanical converting element for generating a torsional vibration for generating a torsional displacement around the axis of the vibration element, and the longitudinal vibration generating electromechanical converting element and the torsional vibration generating electromechanical converting element are provided on a substantially same plane.

19 Claims, 21 Drawing Sheets

DIRECTION OF SHEAR DEFORMATION ON APPLYING POSITIVE VOLTAGE

VIBRATION ACTUATOR

This application is a continuation, of application Ser. No. 08/715,471, filed Sep. 18, 1996, now abandoned.

BACKGROUND OF THE INVENTION

1. Field of the Invention

The present invention relates to a vibration actuator utilizing a synthesized vibration of an elongation-contraction vibration and a torsional vibration. More specifically, the present invention relates to a vibration actuator of so-called different mode degenerate type having a vibration element adhered to electromechanical converting elements and adapted to generate plural vibration modes, and a relative movement member maintained in pressure contact with the vibration element. In particular, the present invention relates to a vibration actuator capable of improving mechanical strength and driving characteristics without sacrificing the driving efficiency and allowing exact detection of the status of the generated vibrations.

2. Related Background Art

FIG. 1 is a perspective view of a conventional longitudinal-torsional vibration actuator.

In a conventional vibration actuator, a stator 1 is composed of two cylindrical vibration elements 2, 3 between which a piezoelectric element 4 for torsional vibration is sandwiched, and a piezoelectric element 5 for longitudinal vibration is provided on the vibration element 3. The piezoelectric element 4 for the torsional vibration is polarized in the circumferential direction, while the piezoelectric element 5 for the longitudinal vibration is polarized in the vertical direction. A relative movement member (rotor) 6 is provided on the piezoelectric element 5 for the longitudinal vibration.

The vibration elements 2, 3 and the piezoelectric elements 4, 5, constituting the stator 1, are affixed by rotatably fastening onto a screw portion formed on a shaft 7. The rotor 6 is rotatably supported by the shaft 7, by means of a ball bearing 8 provided at the center. A nut 9 is screwed on an end of the shaft 7, and a spring 10 is provided between the ball bearing 8 and the nut 9. As indicated by an arrow F, the rotor 6 is maintained in contact with an end face of the stator 1 under pressure, by the function of the spring 10.

The piezoelectric element 4 for the torsional vibration and the piezoelectric element 5 for the longitudinal vibration are driven by a driving voltage of a same frequency generated by a generator 11, schematically shown in FIG. 1, with a phase control by a phase shifter 12.

The piezoelectric element 4 for the torsional vibration generates a mechanical displacement for causing the rotation of the rotor 6. On the other hand, the piezoelectric element 5 for the longitudinal vibration performs a clutch function, for periodically varying the frictional force between the stator 1 and the rotor 6 in synchronization with the torsional vibration generated by the piezoelectric element 4, thereby converting the vibration into a one-directional movement.

FIG. 2 is an exploded perspective view of the stator 1 of the vibration actuator shown in FIG. 1.

As the piezoelectric element 4 for the torsional vibration has to be polarized in the circumferential direction, the piezoelectric material is divided into 6 to 8 sector-shaped pieces as shown in FIG. 2, which are individually polarized in the circumferential direction and then assembled again into annular shape. Electrode 13 is provided thereon.

However, in the conventional vibration actuator shown in FIGS. 1 and 2, it has been difficult to obtain sufficient precision during assembly of the piezoelectric element 4 for the torsional vibration into the annular shape. For this reason, the mutual contact between the piezoelectric element 4 and the vibration element 3 or between the piezoelectric elements 4 is hindered. As a result, the vibration of the piezoelectric elements 4 cannot be sufficiently transmitted to the vibration elements 2, 3, whereby the performance of the vibration actuator is deteriorated.

Also the piezoelectric element 4 for the torsional vibration, being assembled by adhering sector-shaped pieces, requires a thickness of at least several millimeters in order to obtain a sufficient adhesion strength. For this reason the distance between the electrodes of the piezoelectric element 4 becomes large, thus requiring a high voltage in order to provide the piezoelectric element 4 with an electric field necessary for driving.

On the other hand, the area of the piezoelectric element 4 for the torsional vibration and that of the piezoelectric element 5 for the longitudinal vibration is approximately equal to or smaller than the cross section of the vibration element 2 or 3. Also, for passing the shaft 7, the piezoelectric element 4 for the torsional vibration and the piezoelectric element 5 for the longitudinal vibration have to be provided with a hole at the center. Consequently the area of each of the piezoelectric element 4 for the torsional vibration and that of the piezoelectric element 5 for the axial vibration becomes even smaller, so that it has been difficult to obtain a higher torque and a higher revolution in the actuator.

For this reason, the present applicant has proposed, for example in the Japanese Patent Application Nos. 6-180279 and 6-275022, a vibration actuator employing a vibration element of different-mode degenerate type, utilizing a first-order elongation contraction (longitudinal) vibration and a first-order (or second-order) torsional vibration.

FIGS. 3A, 3B and 3C are views showing the driving principle of such vibration actuator, generating an elliptical movement on a driving face of the vibration element by the combination of a longitudinal vibration and a torsional vibration, wherein FIGS. 3A and 3B are respectively a plan view and a lateral view, and FIG. 3C is a wave form chart showing the longitudinal and torsional vibrations generated in the vibration element.

A vibration element 21 is composed by combining two semicircular cylindrical elastic halves 22, 23 of a form obtained by vertically dividing a hollow cylindrical elastic member by a plane containing the rotary axis thereof. Between the two semicircular cylindrical elastic halves 22, 23 there are adhered four piezoelectric elements 24, 25, two on each side, constituting the electromechanical converting elements, and, upon excitation of the piezoelectric elements 24, 25 by drive signals, there are generated a first-order torsional vibration and a first-order longitudinal vibration in the vibration element 21 as shown in FIG. 3C.

If the longitudinal and torsional vibrations generated in the vibration element 21 have approximately same resonance frequencies, such longitudinal and torsional vibrations are simultaneously generated in the vibration element (such state being hereinafter called "degenerate" state), and a driving face D, which is an end face of the vibration element 21, causes an elliptical movement in which a point orbit is an ellipse.

The elliptical movement thus generated drives a moving element 26, constituting the relative movement member maintained in pressure contact with the driving face D, by rotary motion of the moving element 26.

FIGS. 4A and 4B are respectively a plan view and a lateral view, showing the details of the structure of the vibration element 21.

The vibration element 21 is composed by combining two semicircular cylindrical elastic halves 22, 23 of a form obtained by vertically dividing a hollow cylindrical member 20, and between divided faces 22a, 23a of the elastic halves 22, 23 there are inserted piezoelectric elements 24, 25 and electrode plates 27, 28, 29 in a laminated state as shown in the drawing.

The piezoelectric elements 24, 25 are provided in two groups, each of which has four layers. Among such four layers, two layers (piezoelectric element 25 for torsional vibration) are made of a piezoelectric material utilizing a piezoelectric constant $d_{15}$, while other two layers (piezoelectric element 24 for longitudinal vibration) are made of a piezoelectric material utilizing a piezoelectric constant $d_{31}$. The piezoelectric element 25 utilizing a piezoelectric constant $d_{15}$, for the torsional vibration, generates a shear deformation in the longitudinal direction of the vibration element 21.

The piezoelectric element 25 for the torsional vibration generates a torsional displacement in the vibration element 21 under a voltage application, while the piezoelectric element 24 for the longitudinal vibration generates a longitudinal shear deformation in the vibration element 21 under a voltage application.

Thus, in response to a sinusoidal voltage input to the piezoelectric element 25 for the torsional vibration, the vibration element 21 generates a torsional vibration, and, in response to a sinusoidal voltage input to the piezoelectric element 24 for the longitudinal vibration, the vibration element 21 generates an elongation-contraction (longitudinal) vibration.

FIGS. 5A and 5B show another conventional example of the different-mode degenerate vibration element.

More specifically, FIGS. 5A and 5B are respectively a plan view and a lateral view of a vibration element 31 of different-mode degenerate type, to be employed in a vibration actuator.

The vibration element 31 is provided with piezoelectric elements 34, 35 constituting the electromechanical converting elements for converting electric energy into a mechanical displacement, and a hollow cylindrical elastic member 30 generating an elongation-contraction vibration and a torsional vibration by the oscillation of these piezoelectric elements 34, 35.

The hollow cylindrical elastic member 30 is formed by combining two elastic halves 32, 33 of a form obtained by vertically dividing a hollow cylindrical member with a plane containing the central axis. On the external periphery of the hollow cylindrical elastic member 30 there is formed a smaller diameter portion 30a of a groove shape, which defines a first larger diameter portion 30A and a second larger diameter portion 30B. Therefore, on the external periphery of the cylindrical elastic member 30 there are in succession formed, along the central axis thereof (vertical direction in FIG. 5B), the first larger diameter portion 30A, the smaller diameter portion 30a and the second larger diameter portion 30B.

Between divided faces 32a, 33a of the elastic halves 32, 33, there are sandwiched four layers of piezoelectric elements 34, 35, each having two layers, and electrode plates 37, 38, 39 for applying drive voltages to the piezoelectric elements 34, 35.

The piezoelectric elements 34, 35 mounted between the divided faces 32a, 33a are composed of two layers each or four layers in total, in which the piezoelectric elements 35 of two layers generate a shear displacement in the longitudinal direction of the elastic halves 32, 33, utilizing the piezoelectric constant $d_{15}$, while the piezoelectric elements 34 of remaining two layers generate an elongation-contraction displacement in the longitudinal direction of the elastic halves 32, 33, utilizing the piezoelectric constant $d_{31}$.

The elastic halves 32, 33 generate a torsional displacement in response to the application of a drive voltage to the piezoelectric elements 35, while they generates a longitudinal displacement in response to the application of a drive voltage to the piezoelectric elements 34. Consequently the cylindrical elastic member 30 generates a torsional vibration in response to the application of a sinusoidal voltage to the piezoelectric elements 35 for the torsional vibration, and it generates a longitudinal vibration in response to the application of a sinusoidal voltage to the piezoelectric elements 34 for the longitudinal vibration.

On a driving face D, constituting an end face of the vibration element 31, a cylindrical movable element 26, constituting the relative movement member and rotatably supported, is maintained in contact under a suitable pressure.

FIG. 6 shows the development in time of an elliptical movement on the driving face D, in the vibration element 21 or 31 shown in FIGS. 4A, 4B, 5A and 5B, by the combination of the torsional vibration (T-mode) and the longitudinal (elongation-contraction) vibration (L-mode) generated in the vibration element 21 or 31.

As shown in FIG. 6, a given point on the driving face D generates an elliptical movement, by giving a phase difference of (¼) λ between the cycles of the torsional vibration T and those of the longitudinal vibration L, wherein λ is the wavelength. Now a driving frequency f is assumed to correspond to an angular frequency ω (=2πf). At a time t=(6/4)·(π/ω), the displacement of the torsional vibration T is at a maximum at the left, while the displacement of the longitudinal vibration L is zero. In this state the movable member 26 is maintained in pressure contact, by means of an unrepresented pressurizing mechanism, with the driving face D of the vibration element 21 or 31.

Then, in a period from t=(7/4)·(π/ω) through t=0 to t=(2/4)·(π/ω), the torsional vibration T varies from the maximum at the left to the maximum at the right, while the longitudinal vibration L varies from zero to the maximum at the top and returns to zero. Consequently a given point on the driving face D of the vibration element 21 or 31 rotates to the right, while pushing the moving element 26, which is thus driven.

Then, in a period from t=(2/4)·(π/ω) to t=(6/4)·(π/ω), the torsional vibration T varies from the maximum at the right to the maximum at the left, while the longitudinal vibration L varies from zero to the maximum at the bottom side and returns to zero. Consequently the given point on the driving face D of the vibration element 21 or 31 rotates to the left while it is separated from the movable element 26, so that the movable element is not driven. Though being pressurized by the pressing member, the movable member 26 does not follow the contraction of the vibration element 21 or 31 because of a significant difference in natural frequency.

If the resonance frequencies of the torsional vibration and the longitudinal vibration are approximately same, the vibration element 21 or 31 simultaneously generate the torsional and longitudinal vibrations (degenerate state) to generate the elliptical movement on the driving face D, thereby generating a driving force.

In a state of generation of such elliptical movement, by approximately matching the frequency of the torsional vibration with the resonance frequency thereof and also approximately matching the frequency of the longitudinal vibration with the resonance frequency thereof, there is attained a resonance state whereby the elliptical movement on the driving face D is enhanced.

In such a vibration actuator of the different-mode degenerate type, the piezoelectric elements 24, 25 or 34, 35 are provided, along the axial direction of the cylindrical member 20 or 30, over the entire divided faces 22a, 23a or 32a, 33a. Stated differently, the piezoelectric elements 24, 25 or 34, 35 are present on the two nodal positions of the torsional vibration, across the loop position thereof.

In case of generating a torsional vibration and a longitudinal vibration by the piezoelectric elements mounted on the elastic member, the piezoelectric elements are in general provided in positions including the nodes of these vibrations, because such positioning enables effective generation of the torsional and longitudinal vibrations, as the node shows the maximum distortion displacement in each vibration.

However, in the vibration actuator of the different-mode degenerate type shown in FIGS. 4A, 4B, 5A and 5B, the piezoelectric elements are also provided in the loop positions of the torsional and longitudinal vibrations. Such loop positions only show a small distortion displacement. Consequently the piezoelectric elements provided in such loop positions do not effectively contribute to the generation of the vibration, and the energy supplied to such piezoelectric elements is not effectively utilized. For this reason the driving efficiency of the vibration actuator could not be improved.

The vibration actuator proposed in the aforementioned Japanese Patent Application No. 6-275022 generates an elliptical movement on the driving face D by combining a first-order longitudinal vibration and a first-order torsional vibration. Therefore, in order to position the piezoelectric elements on the mutually close nodal positions of such vibrations, the piezoelectric elements 24 or 34 for the longitudinal vibration and the piezoelectric elements 25 or 35 for the torsional vibration have to be mutually superposed and positioned between the divided faces 22a, 23a or 32a, 33a of the vibration element 21 or 31.

It is therefore necessary to assemble the vibration elements 21 or 31 by laminating and adhering respectively the two semicircular elastic halves 22, 23 or 32, 33, the piezoelectric elements 24 or 34 of two layers for the longitudinal vibration, the piezoelectric elements 25 or 35 of two layers for the torsional vibration, and three electrodes 27, 28, 29 or 37, 38, 39. Such increased number of components of the vibration element 21 or 31 complicates the assembling step at the adhesion, thus increasing the number of work steps required.

Also the vibration actuator proposed in the aforementioned Japanese Patent Application No. 6-275022 is insufficient in the reliability in the prolonged continuous drive, in the moisture resistance and in the temperature resistance, since the vibration element 21 or 31 is formed by adhesion of the components, involving a large number of points of adhesion.

Also in the vibration actuator proposed in the aforementioned Japanese Patent Application No. 6-275022, in generating the longitudinal and torsional vibrations in the vibration element 21 or 31, the torsional vibration is easier to generate than the longitudinal vibration. Therefore, the torsional vibration can be sufficiently generated even with the piezoelectric elements 25 or 35 for the torsional vibration being smaller respectively than those 24 or 34 for the longitudinal vibration. Smaller piezoelectric elements 25, 35 for the torsional vibration can correspondingly reduce the electrostatic capacitance, thereby decreasing the required input energy and thus improving the driving efficiency.

However, in the vibration actuator proposed in the Japanese Patent Application No. 6-275022, it is difficult to vary the size of the piezoelectric elements 25, 35 for the torsional vibration and of the piezoelectric elements 24, 34 for the longitudinal vibration, since they have to be mutually superposed.

Also, in case of maintaining the movable element 26 in pressure contact with the vibration element 21 (31) as shown in FIG. 3B, the movable element 26 has to be pressed in the direction of the longitudinal vibration. For this reason, the longitudinal vibration of the vibration element 21 (31) may be attenuated by such pressing of the movable element 26.

In order to minimize such attenuation of the longitudinal vibration resulting from the pressing of the movable element 26, it is required to increase the size of the piezoelectric elements 24 or 34 for the longitudinal vibration in comparison respectively with that of the piezoelectric elements 25 or 35 for the torsional vibration. However, in the vibration actuator proposed in the Japanese Patent Application No. 6-275022, it is difficult to vary the size of the piezoelectric elements 25 or 35 for the torsional vibration and of the piezoelectric elements 24 or 34 for the longitudinal vibration, because of the above-mentioned reason.

SUMMARY OF THE INVENTION

According to an embodiment of the present invention, there is provided a vibration actuator comprising a vibration element including an elastic member and an electromechanical converting element, and a relative movement member maintained in pressure contact with a driving face of the vibration element, wherein the electromechanical converting element includes an electromechanical converting element for generating a longitudinal vibration for inducing a displacement along the axial direction of the vibration element and an electromechanical converting element for generating a torsional vibration for inducing a torsional displacement around the axis of the vibration element, and the electromechanical converting element for the longitudinal vibration and the electromechanical converting element for the torsional vibration are provided on a substantially same plane.

In the above-mentioned vibration actuator, the electromechanical converting element for the longitudinal vibration is preferably provided in a position including a node of the longitudinal vibration, and the electromechanical converting element for the torsional vibration is preferably provided in a position including a node of the torsional vibration.

In the above-mentioned vibration actuator, the electromechanical converting elements are adhered to the elastic member, and the area of adhesion between the electromechanical converting element for the torsional vibration and the elastic member is preferably smaller than that between electromechanical converting element for the longitudinal vibration and the elastic member.

According to another embodiment of the present invention, there is provided a vibration actuator comprising a vibration element including an elastic member and an electromechanical converting element, and a relative movement member maintained in pressure contact with a driving face of the vibration element, wherein the electromechanical converting element is adapted to generate a longitudinal vibration for inducing a displacement along the axial direction of the vibration element and a torsional vibration for inducing a torsional displacement around the axis of the vibration element, and the vibration actuator further comprises a mechanoelectrical converting element, provided in a part of the vibration element including a position corresponding to the loop of the longitudinal or torsional vibration, for converting the mechanical displacement into an electrical energy.

In the above-mentioned vibration actuator, the vibration element is preferably shaped cylindrically, and the above-mentioned part of the vibration element is preferably an end thereof along the axis thereof.

According to still another embodiment of the present invention, there is provided a vibration actuator comprising a vibration element including an elastic member and an electromechanical converting element, and a relative movement member maintained in pressure contact with a driving face of the vibration element, wherein the electromechanical converting element is adapted to generate a longitudinal vibration for inducing a displacement along the axial direction of the vibration element and a torsional vibration for inducing a torsional displacement around the axis of the vibration element, and the vibration actuator further comprises a reinforcement member, provided in a part of the vibration element including a position corresponding to the loop of the longitudinal or torsional vibration.

In the above-mentioned vibration actuator, the vibration element is preferably shaped cylindrically, and the above-mentioned part of the vibration element is preferably an end thereof along the axis thereof.

According to still another embodiment of the present invention, there is provided a vibration actuator comprising a vibration element including an elastic member and an electromechanical converting element, and a relative movement member maintained in pressure contact with a driving face of the vibration element, wherein the electromechanical converting element is adapted to generate a longitudinal vibration for inducing a displacement along the axial direction of the vibration element and a torsional vibration for inducing a torsional displacement around the axis of the vibration element, and the electromechanical converting element is provided in a second part of the vibration element, other than a first part thereof including a position corresponding to the loop of the longitudinal or torsional vibration.

In the above-mentioned vibration actuator, the above-mentioned first part is preferably both end portions of the vibration element along the axial direction thereof.

The above-mentioned vibration actuator preferably further comprises a mechanoelectrical converting element provided in the above-mentioned first part, for converting the mechanical displacement into an electrical energy.

The above-mentioned vibration actuator preferably further comprises a reinforcement member provided in the above-mentioned first part, for reinforcing the vibration element.

In the above-mentioned vibration actuator, the longitudinal vibration is preferably of first or higher order, and the torsional vibration is preferably of first or higher order.

BRIEF DESCRIPTION OF THE DRAWINGS

FIGS. 3A to 3C are views showing the driving principle of a vibration actuator generating an elliptical movement in a driving face by combining a longitudinal vibration and a torsional vibration in a vibration element, as proposed in the Japanese Patent Application No. 6-275022, wherein FIGS. 3A and 3B are respectively a plan view and a lateral view of the vibration element and FIG. 3C is a view showing the longitudinal and torsional vibrations generated therein;

FIGS. 15A, 15B and 15C are views showing generation of a first-order longitudinal vibration and a second-order torsional vibration in the vibration element, wherein FIGS. 15A and 15B are respectively a plan view and a lateral view of the vibration element and FIG. 15C is a chart showing the state of the longitudinal and torsional vibrations;

FIGS. 20A and 20B are views showing generation of a first-order longitudinal vibration and a second-order torsional vibration in the vibration element by the excitation of the piezoelectric elements in the fourth embodiment, wherein FIG. 20A is a perspective view of the vibration element and FIG. 20B is a chart showing the state of the longitudinal and torsional vibrations generated in the vibration element;

FIGS. 22A, 22B and 22C are views showing the details of the structure of a vibration element to be employed in the ultrasonic actuator of the fifth embodiment, wherein FIGS. 22A and 22B are respectively a plan view of the vibration element and a lateral view thereof showing the arrangement of the piezoelectric elements, and FIG. 22C is a chart showing the state of generation of the longitudinal and torsional vibration in the vibration element; and FIGS. 23A, 23B and 23C are views showing a sixth embodiment, wherein FIGS. 23A and 23B are respectively a plan view of the vibration element and a lateral view thereof showing the arrangement of the piezoelectric elements, and FIG. 23C is a chart showing the state of generation of the longitudinal and torsional vibrations in the vibration element.

DESCRIPTION OF THE PREFERRED EMBODIMENTS

[First Embodiment]

Now the vibration actuator of the present invention will be clarified in detail by preferred embodiments thereof shown in the attached drawings.

Figure 7:
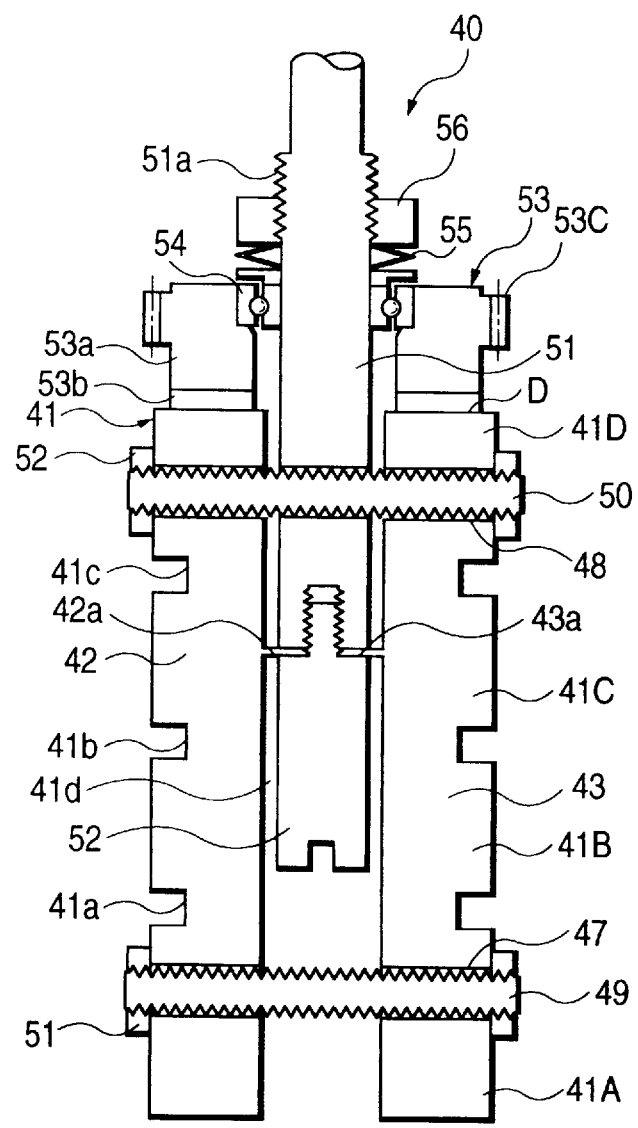
FIG. 7 is a cross-sectional view showing the structure of a vibration actuator constituting a first embodiment of the present invention.

FIG. 7 is a cross-sectional view of a vibration actuator 40 constituting a first embodiment of the present invention.

Figure 8A:
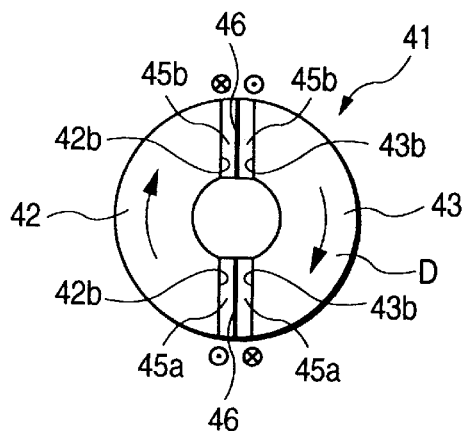
FIGS. 8A, 8B and 8C are views showing the arrangement of piezoelectric elements in a vibration element 41 of the vibration actuator of the first embodiment.
Figure 8B:
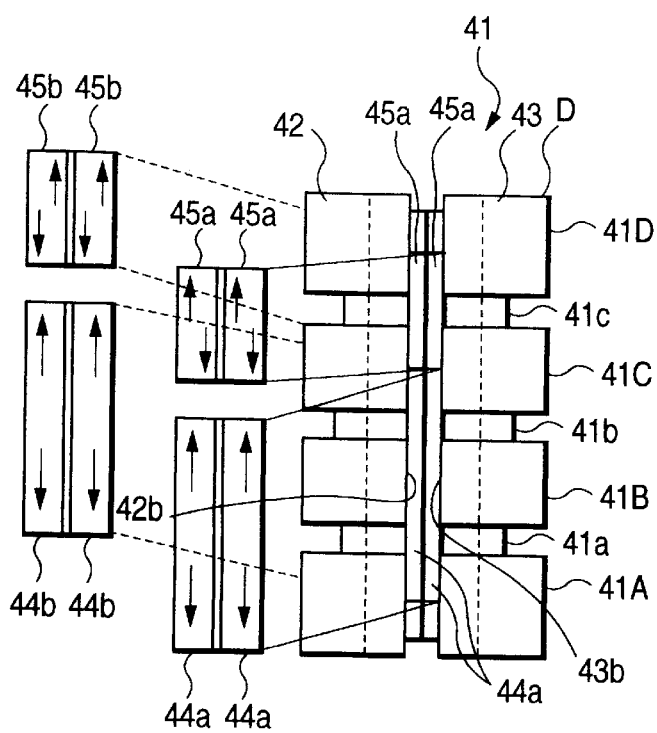

As shown in FIGS. 8A and 8B, a vibration element 41 is composed of piezoelectric elements 44a, 44b, 45a, 45b constituting electromechanical converting elements to be excited by drive signals, and elastic halves 42, 43 adhered to such piezoelectric elements and adapted to generate a first-order longitudinal vibration and a second-order torsional vibration by the excitation of these piezoelectric elements thereby generating a driving force on a driving face D.

A vibration element 41 is formed by a metal such as steel, stainless steel or phosphor bronze, and is composed by combining semicircular hollow elastic halves 42, 43 obtained by longitudinally bisecting a thick-walled cylinder having four larger diameter portions 41A, 41B, 41C and 41D and three smaller diameter portions 41a, 41b and 41c. Between the semicircular elastic halves 42, 43, the piezoelectric elements 44a, 44b, 45a, 45b in two layers and an electrode 46 are supported in a sandwiched state.

The smaller diameter portions 41a, 41b and 41c are provided in positions including nodal positions of the second-order torsional vibration. The piezoelectric elements 45a, 45b for the torsional vibration are provided in positions including a nodal position of the generated torsional vibration, and the piezoelectric elements 44a, 44b for the longitudinal vibration are provided in positions including the nodal positions of the first-order longitudinal vibration. The vibration element 41 is given the four larger diameter portions 41A–41D and the three smaller diameter portions 41a–41c, in order that the first order longitudinal vibration and the second order torsional vibration have approximately same resonance frequencies, thereby creating a degenerate state. The piezoelectric elements 45a, 45b for the torsional vibration and those 44a, 44b for the longitudinal vibration, both being omitted in FIG. 7, will be explained in detail later with reference to FIGS. 8A and 8B.

The vibration element 41 is provided, at the approximate center in the longitudinal direction, with penetrating holes 47, 48 in a direction parallel to the direction of lamination of the piezoelectric elements 45a, 45b, 44a, 44b for the torsional and longitudinal vibrations.

The semicircular elastic halves 42, 43 support therebetween the piezoelectric elements 45a, 45b for the torsional vibration and 44a, 44b for the longitudinal vibration, by way of bolts 49, 50 inserted into the penetrating holes 47, 48 and fixed with nuts 51, 52.

The vibration element 41 is also provided, at the approximate center in the longitudinal direction, with annular flange portions 42a, 43a extended toward the center, and such annular flange portions are pinched in the vertical direction between an upper cylindrical fixed shaft 51 and a lower cylindrical fixed shaft 52 which are mutually coupled by screw fitting, whereby the vibration element 41 is fixed to the cylindrical fixed shafts 51, 52 passing therethrough.

A thick-walled annular movable element 53, constituting the relative movement member, is composed of a movable element body 53a formed for example with stainless steel or aluminum alloy, and a sliding member 53b composed principally of a polymer material and maintained in contact with a driving face D of the vibration element 41, and is defined in position with respect to the fixed shaft 51 by a positioning member 54 such as a bearing fitted on the internal periphery.

The movable element body 53a is provided on the external periphery thereof with a gear 53c for power output, and the power of the gear 53c is transmitted to an unrepresented driven gear.

The movable element 53 is maintained in pressure contact with the driving face D of the vibration element 41, by a pressurizing member 55 such as a belleville spring, a coil spring or a plate spring.

The cylindrical fixed shafts 51, 52 pass through a hollow portion 41d, formed in the longitudinal direction of the vibration element 41, and serve to fix the vibration element 41 by pinching the flange portions 42a, 43a thereof and to define the radial position of the movable element 53.

The upper fixed shaft 51 is further provided with a screw portion 51a, for fitting an adjustment member 56, such as a nut, for adjusting the pressure of the pressurizing member 55.

Figure 8C:
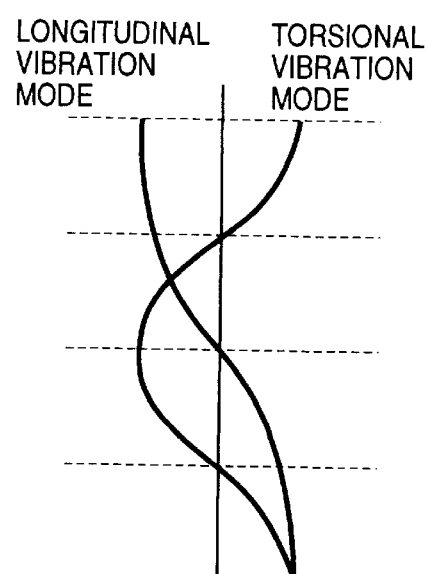

FIGS. 8A to 8C are views showing the arrangement of the piezoelectric elements in the vibration element 41.

The vibration element 41 is composed of elastic halves 42, 43 obtained by longitudinally bisecting a thick-walled hollow cylinder having four larger diameter portions 41A–41D and three smaller diameter portions 41a–41c. The piezoelectric elements 44a, 44b, 45a, 45b in two layers and an electrode 46 are supported in a sandwiched state between divided faces 42b, 43b of the elastic halves.

The smaller diameter portions 41a–41c are provided at the nodes of the torsional vibration. Thus the piezoelectric elements 45a, 45b for the torsional vibration are provided at a node of the generated torsional vibration, while the piezoelectric elements 44a, 44b for the longitudinal vibration are so provided as to bridge the node of the generated longitudinal vibration.

The piezoelectric elements 45a, 45b for the torsional vibration are composed of piezoelectric members utilizing the piezoelectric constant $d_{15}$, and generate shear deformation according to the direction of an applied AC voltage (frequency voltage), thereby generating a torsional vibration.

More specifically, the piezoelectric elements for the torsional vibration are composed of two piezoelectric elements 45a provided at the front side in FIG. 8B and two piezoelectric elements 45b provided at the rear side in FIG. 8B, which are so arranged that the elements 45a at the front side and the elements 45b at the rear side generate shear deformations in mutually opposite directions in response to the applied voltage of a same direction, whereby the vibration element 41 generates a torsional displacement in a certain direction.

For example, when the piezoelectric elements 45a at the front side and the piezoelectric elements 45b at the rear side generate shear deformations as shown in FIG. 8B, the driving face D is twisted as indicated by arrows in FIG. 8A. Also in response to an applied voltage of the opposite direction, the shear deformations are generated in the opposite direction whereby the driving face D is twisted in a direction opposite to the arrows shown in FIG. 8A.

On the other hand, the piezoelectric elements 44a, 44b for the longitudinal vibration are composed of piezoelectric members utilizing the piezoelectric constant $d_{31}$, and generate elongation-contraction deformation according to the direction of an applied AC voltage (frequency voltage), thereby generating a longitudinal vibration.

More specifically, the piezoelectric elements for the longitudinal vibration are composed of two piezoelectric elements 44a provided at the front side in FIG. 8B and two piezoelectric elements 44b provided at the rear side in FIG. 8B, which are so arranged as to generate the longitudinal deformation in a same direction in response to the applied voltage of a same direction.

Such arrangement of the piezoelectric elements 44a, 44b for the longitudinal vibration facilitates the generation of a first-order longitudinal vibration in response to a same AC voltage (frequency voltage) applied thereto.

In the present embodiment, the size of the piezoelectric elements 45a, 45b for the torsional vibration is selected smaller than that of the piezoelectric elements 44a, 44b for the longitudinal vibration, whereby the surface area of the former is smaller than that of the latter.

Figure 9:
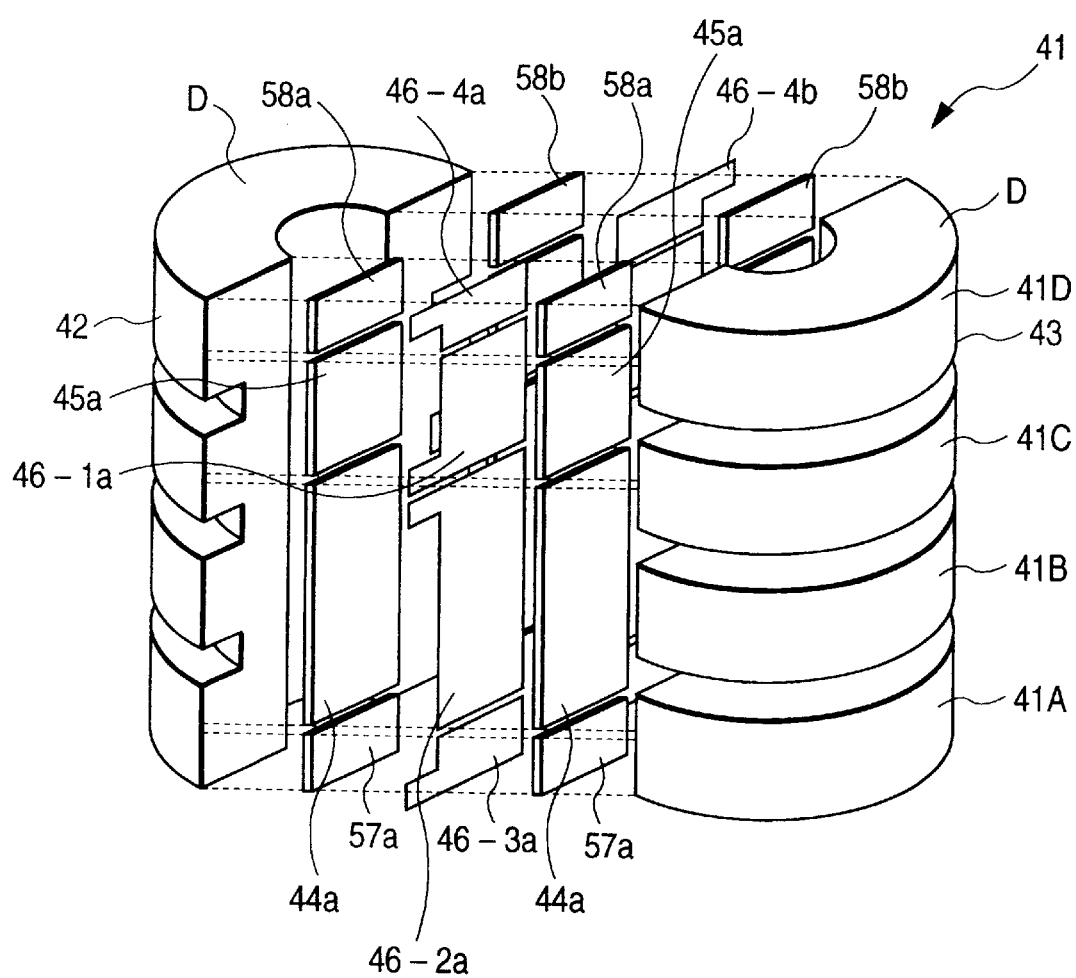
FIG. 9 is an exploded perspective view showing the arrangement of semicircular elastic halves, piezoelectric elements for the longitudinal vibration, those for the torsional vibration, those for detecting the longitudinal vibration, those for detecting the torsional vibration and electrodes, constituting the vibration element of the first embodiment.

FIG. 9 is an exploded view showing the arrangement of the semicircular elastic halves 42, 43, piezoelectric elements 45a, 45b for the longitudinal vibration, those 44a, 44b for the torsional vibration, those 57a, 57b for detecting the longitudinal vibration, those 58a, 58b for detecting the torsional vibration, and electrodes 46-1a, 46-1b, 46-2a, 46-2b, 46-3a, 46-3b, 46-4a, 46-4b, constituting the vibration element 41. In FIG. 9, the symbols are only shown for the illustrated components, but are omitted for the hidden components (to be given suffixes b) because the vibration element 41 is symmetrical with respect to the axis.

Between the bi-sectioned semicircular elastic halves 42, 43, there are supported in sandwiched state the piezoelectric elements 45a, 45b for the longitudinal vibration, those 44a, 44b for the torsional vibration, those 57a, 57b for detecting the longitudinal vibration, those 58a, 58b for detecting the torsional vibration, and the electrodes 46-1a, 46-1b, 46-2a, 46-2b for applying drive voltages to the piezoelectric elements 45a, 45b, 44a, 44b, and the electrodes 46-3a, 46-3b, 46-4a, 46-4b for applying voltages to the detecting piezoelectric elements 57a, 57b, 58a, 58b. The semicircular elastic halves 42, 43, the piezoelectric elements 45a, 45b for the longitudinal vibration, those 44a, 44b for the torsional vibration and the electrodes 46-1a, 46-1b, 46-2a, 46-2b are adhered with an adhesive material.

The piezoelectric elements 58a, 58b for detecting the torsional vibration are provided closer to the driving face D of the vibration element 41 than the piezoelectric elements 45a, 45b, and the piezoelectric elements 57a, 57b for detecting the longitudinal vibration are provided farther from the driving face D of the vibration element 41 than the piezoelectric elements 44a, 44b. The electrodes 46-1a, 46-1b, 46-2a, 46-2b are so positioned as to be capable of simultaneously applying drive voltages to the twolayered piezoelectric elements 44a, 44b for the longitudinal vibration and the two-layered piezoelectric elements 45a, 45b for the torsional vibration.

By applying two drive signals having a mutual phase difference of ¼ λ, respectively, the piezoelectric elements 44a, 44b for the longitudinal vibration and those 45a, 45b for the torsional vibration in the vibration actuator 40 of the above-explained configuration, the longitudinal vibration and the torsional vibration are mutually displaced in phase by 90°, and the driving face D of the vibration element 41 generates an elliptical movement by the synthesis of these vibrations.

Figure 10:
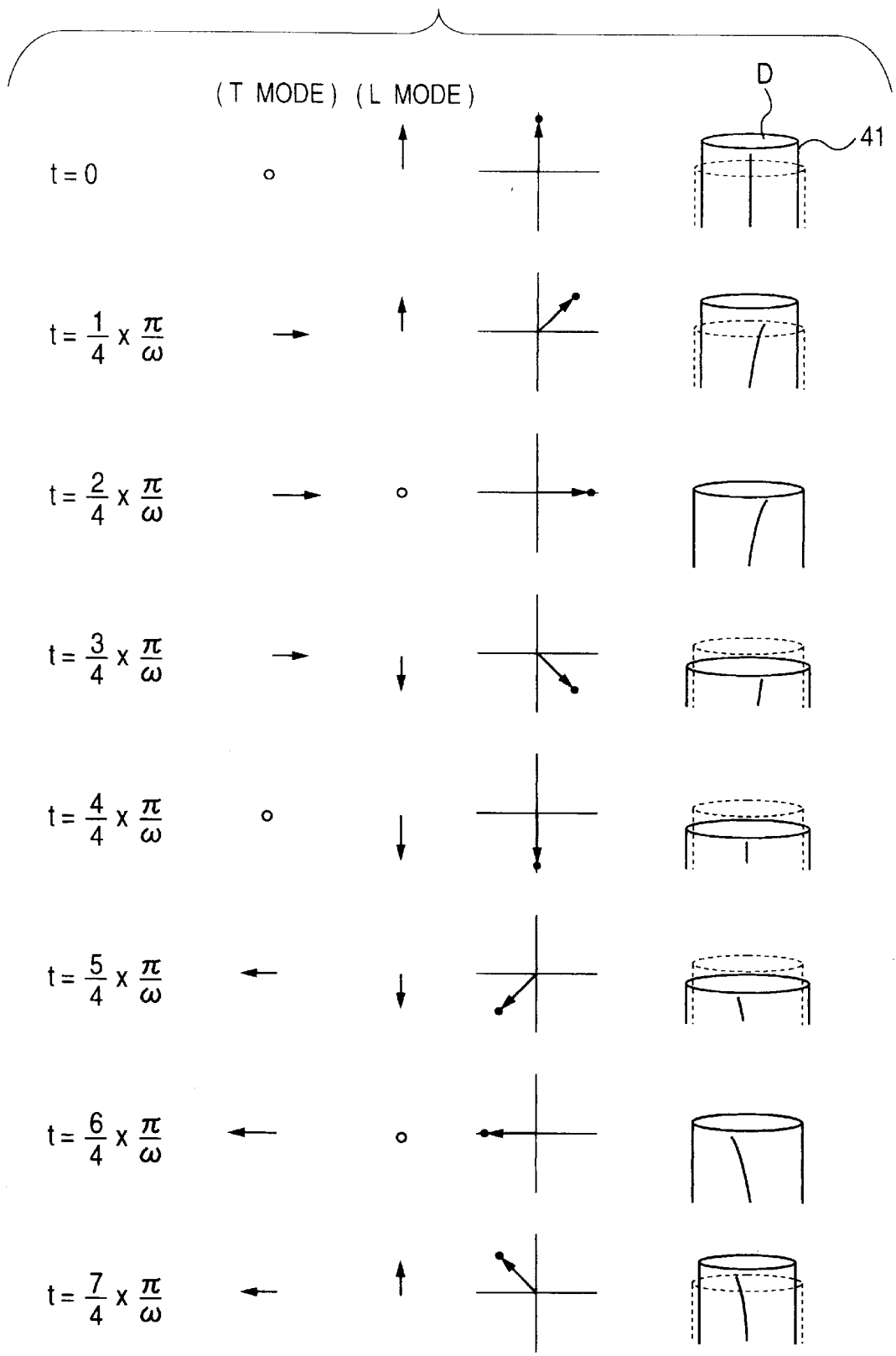
FIG. 10 is a view showing generation of an elliptical movement, in time, on a driving face D by the combination of torsional and longitudinal vibrations generated in the vibration element, in the vibration actuator of the first embodiment of the present invention.

FIG. 10 shows the principle of generation, in time of such elliptical movement on the driving face D, by the combination of the torsional vibration and the longitudinal (elongation-contraction) vibration generated in the vibration element 41. In FIG. 10, the movable element 53 constituting the relative movement member is omitted for the purpose of simplicity.

As shown in FIG. 10, the driving face D of the vibration element 41 generates an elliptical movement, by giving a phase difference of (¼) λ between the cycles of the torsional vibration and those of the longitudinal vibration, wherein λ is the wavelength. The driving frequency f is assumed to correspond to an angular frequency ω (=2πf).

At a time $t=(5/4) \cdot (\pi/\omega)$, the displacement of the torsional vibration T is at a maximum at the left, while the displacement of the longitudinal vibration L is zero. In this state the movable element is maintained in pressure contact, by means of an unrepresented pressurizing member, with the driving face D of the vibration element 41.

Then, in a period from $t=(7/4) \cdot (\pi/\omega)$ through t=0 to $t=(2/4) \cdot (\pi/\omega)$, the torsional vibration T varies from the maximum at the left to the maximum at the right, while the longitudinal vibration L varies from zero to the maximum at the top and returns to zero. Consequently the driving face D of the vibration element 41 rotates to the right, while pushing the movable element, which is thus driven.

Then, in a period from $t=(2/4) \cdot (\pi/\omega)$ to $t=(6/4) \cdot (\pi/\omega)$, the torsional vibration T varies from the maximum at the right to the maximum at the left, while the longitudinal vibration L varies from zero to the maximum at the bottom side and returns to zero. Consequently the driving face D of the vibration element 41 rotates to the left while it is separated from the movable element, so that the movable element is not driven. Though being pressurized by the pressurizing member, the movable member cannot follow the contraction of the vibration element 41 because the natural frequency of the pressurizing member is lower than the ultrasonic range.

In the present embodiment, the vibration element 41 is so designed as to generate the longitudinal and torsional vibrations of different orders, more specifically a first-order longitudinal vibration and a higher second-order torsional vibration, so that the nodal points of the longitudinal and torsional vibrations can be intentionally positioned mutually different.

In the present embodiment, though the piezoelectric elements 45a, 45b for the torsional vibration and those 44a, 44b for the longitudinal vibration are sandwiched between the two elastic halves 42, 43 as in the conventional vibration actuator, the elements 45a, 45b for the torsional vibration and those 44a, 44b for the longitudinal vibration need no longer be superposed as in the conventional vibration actuator, so that the number of layers of the piezoelectric elements can be reduced from four to two and the number of electrodes can be reduced from three layers to one layer.

Consequently, in comparison with the conventional vibration actuator, the vibration actuator 40 of the present embodiment can reduce the number of components and can simplify the assembling process.

Also the number of adhesion layers employed for assembling the semicircular elastic halves 42, 43, the piezoelectric elements 44a, 44b for the longitudinal vibration, those 45a, 45b for the torsional vibration and the electrodes 46 can be reduced from eight layers in the conventional structure to four layers.

In case the semicircular elastic halves 42, 43, the piezoelectric elements 44a, 44b for the longitudinal vibration, those 45a, 45b for the torsional vibration and the electrodes 46 are assembled by adhesion, there may result a peeling of the adhesion layer which is weakest in the mechanical strength, if the vibration element 41 is subjected to a vibration of a large amplitude. By reducing the number of adhered parts, the probability of such peeling is lowered and the reliability in the prolonged continuous drive is improved.

Also as the adhesion layer is susceptible to the influence of environmental conditions such as temperature and humidity, the reliability of the vibration actuator 40 against temperature and humidity can be improved by reducing the number of such adhesion layers.

Also in the present embodiment, as the vibration element 41 is so designed as to generate a first-order longitudinal vibration and a higher second-order torsional vibration, the piezoelectric elements 45a, 45b required for generating the torsional vibration can be provided over a smaller range, and can therefore made smaller in size, whereby the driving efficiency can be improved. Such piezoelectric elements 45a, 45b for the torsional vibration, if extended over the loop of the torsional vibration, requires an increased input though the output is not changed.

The input current to the ultrasonic actuator at the drive point (close to the antiresonance point), determined from an equivalent circuit of the vibration element (quoted from "Introduction to Ultrasonic Motor", p.81, Sogo Denshi Shuppan), is given by the following approximation equation (1):

$$\text{Input current } I = V \cdot R \cdot \omega^2 \cdot Cd^2 \tag{1}$$

wherein Cd: capacitance factor of vibration element 41 (principally electrostatic capacitance of piezoelectric elements)

V: applied voltage

R: resonance resistance of vibration element 41

ω: angular velocity of AC voltage (frequency voltage)

Thus the input current I can be reduced by decreasing the electrostatic capacitance of the piezoelectric elements, by eliminating the piezoelectric elements in an area not contributing much to the vibration.

Also in the present embodiment, the vibration element 41 is so designed as to generate a first-order longitudinal vibration and a higher second-order torsional vibration, whereby the piezoelectric elements 45a, 45b for the torsional vibration can be reduced in size. Such reduction in size of the piezoelectric elements 45a, 45b allows to correspondingly increase the size of the piezoelectric elements 44a, 44b for the longitudinal vibration which is harder to generate in comparison with the torsional vibration, whereby the amplitude of the displacement of the longitudinal vibration can also be improved.

In a so-called different-mode degenerate vibration actuator, as provided in the present embodiment, among the components of elliptical movement on the driving face D of the vibration element 41, a component perpendicular to the driving direction serves as a clutch for power transmission between the vibration element 41 and the movable element 53, and, if such component, perpendicular to the driving direction, among the components of the elliptical movement becomes smaller, the above-mentioned clutching function becomes incomplete, leading to a loss in the driving force or deterioration in the driving efficiency.

However, an increase in the displacement of the longitudinal vibration by the increase in the size of the piezoelectric elements 44a, 44b for the longitudinal vibration as in the present embodiment allows to reduce the attenuation of the longitudinal vibration by the pressing of the movable element 53. It is thus rendered possible to reduce the loss in the driving force or in the driving efficiency.

[Second Embodiment]

Figure 11:
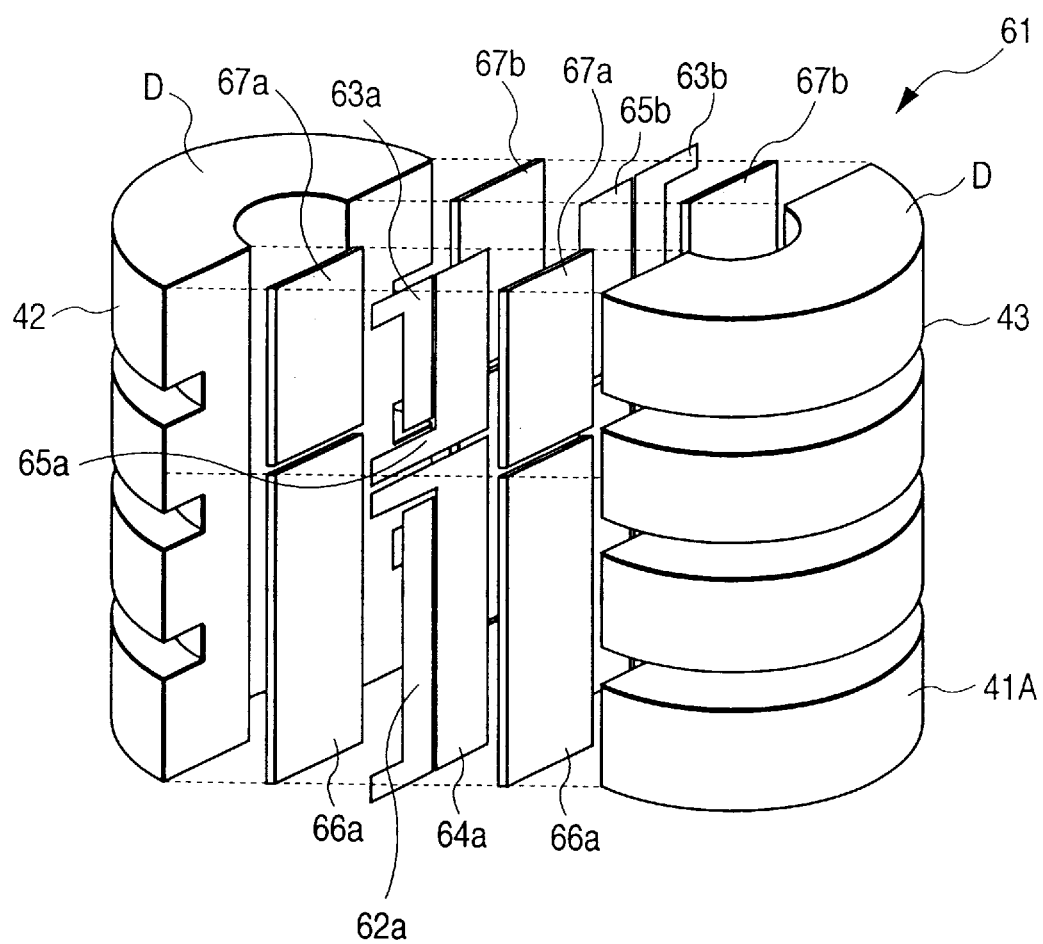
FIG. 11 is an exploded perspective view showing the arrangement of semicircular elastic halves, piezoelectric elements for the longitudinal vibration, those for the torsional vibration, those for detecting the longitudinal vibration, those for detecting the torsional vibration and electrodes, constituting the vibration element of the second embodiment.

FIG. 11 is a schematic view showing the configuration of a second embodiment of the vibration actuator of the present invention.

The following description of the second embodiment will be concentrated in parts different from the first embodiment, and the parts same as those in the first embodiment will be given same numbers and will not be explained further.

In contrast to the first embodiment in which the piezoelectric elements 57a, 57b for detecting the longitudinal vibration and those 58a, 58b, for detecting the torsional vibration are provided respectively close to the driving face D and the opposite face of the vibration element 41, the present embodiment employs piezoelectric elements 66a, 66b, 67a, 67b serving for both generating and detecting the vibrations, and electrodes 62a, 62b for detecting the longitudinal vibration and electrodes 63a, 63b for detecting the torsional vibration are provided at a radially external side of a vibration element 61 while electrodes 64a, 64b for generating the longitudinal vibration and electrodes 65a, 65b for generating the torsional vibration are provided at a radially internal side of the vibration element 61.

Except for such difference in the piezoelectric elements, the electrodes 62a, 62b for detecting the longitudinal vibration and those 63a, 63b for detecting the torsional vibration, the remaining configuration, for example of the elastic halves 42, 43, the fixed shafts 51, 52, the movable element 53 etc. is identical with that in the first embodiment and will not, therefore, be explained further.

By forming the vibration detecting piezoelectric element portions and the vibration generating piezoelectric element portions respectively at the radially external position and at the radially internal position, it is rendered possible to obtain a significant difference in the length between the piezoelectric element portions for the torsional vibration and those for the longitudinal vibration.

Also in the present embodiment, each of the piezoelectric elements 66a, 66b, 67a, 67b is used both for driving and detection.

The detecting function and the exciting function can be separated by employing separate electrodes for detection of vibration and application of the drive signal. Thus, in contrast to the first embodiment employing the piezoelectric elements of four kinds, for generating the torsional vibration, generating the longitudinal vibration, detecting the torsional vibration and detecting the longitudinal vibration, the present embodiment only employs the piezoelectric elements of two kinds, namely 67a, 67b for generating and detecting the torsional vibration and 66a, 66b for generating and detecting the longitudinal vibration, whereby the number of components can further be reduced.

[Third Embodiment]

Figure 12:
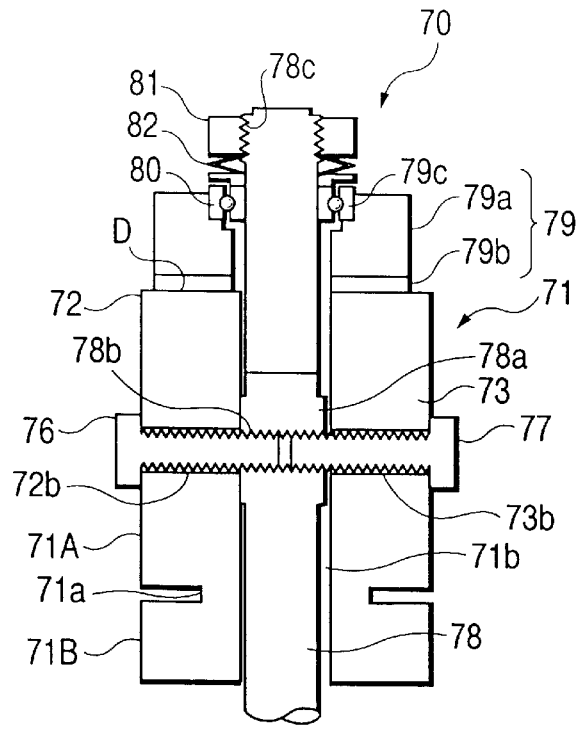
FIG. 12 is a longitudinal cross-sectional view of a vibration actuator constituting a third embodiment of the present invention.

FIG. 12 is a longitudinal cross-sectional view of a vibration actuator 70, constituting a third embodiment of the present invention. In the following embodiments, there will be shown ultrasonic actuators, utilizing the vibrations in the ultrasonic range, as examples of the vibration actuator.

Figure 13:
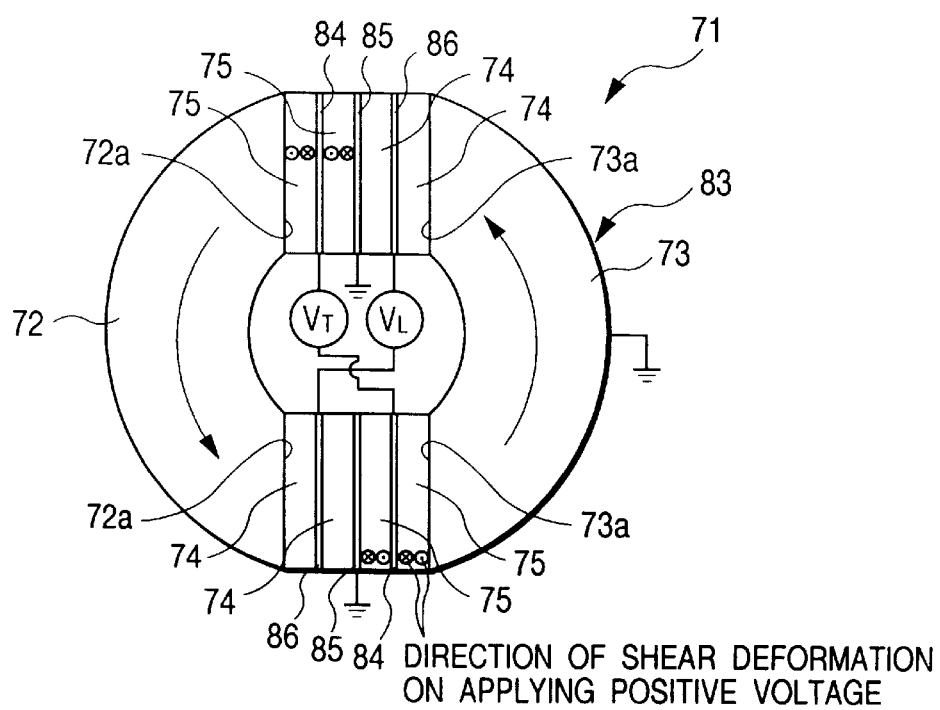
FIG. 13 is a plan view of a vibration element of different-mode degenerate type, to be employed in the vibration actuator of the third embodiment.

A vibration element 71, in the vibration actuator 70 shown in FIG. 12, is composed, as shown in FIG. 13, of piezoelectric elements 74, 75 serving as the electromechanical converting elements driven by drive signals, and elastic halves 72, 73 which are adhered to the piezoelectric elements 74, 75 and generate a first-order longitudinal (elongation-contraction) vibration and a second-order torsional vibration by the excitation of the piezoelectric elements 74, 75 thereby generating a driving force on the driving face D.

The elastic halves 72, 73 are semicircular members obtained by vertically bisecting, along a plane containing an axis, a thick-walled hollow cylindrical member, provided on the external periphery thereof with a first larger diameter portion 71A, a smaller diameter portion 71a and a second larger diameter portion 71B in succession in the axial direction thereof. The piezoelectric elements 74, 75 are supported in sandwiched state between divided faces 72a, 72b of the elastic halves 72, 73.

The axial length of the first larger diameter portion 71A is selected larger than that of the second larger diameter portion 71B. In the present embodiment, the piezoelectric elements 74, 75, for generating vibrations by converting the electrical energy into mechanical displacements, are provided, as shown in FIG. 14, in the range of the first larger diameter portion 71A in the axial direction of the vibration element.

Figure 14:
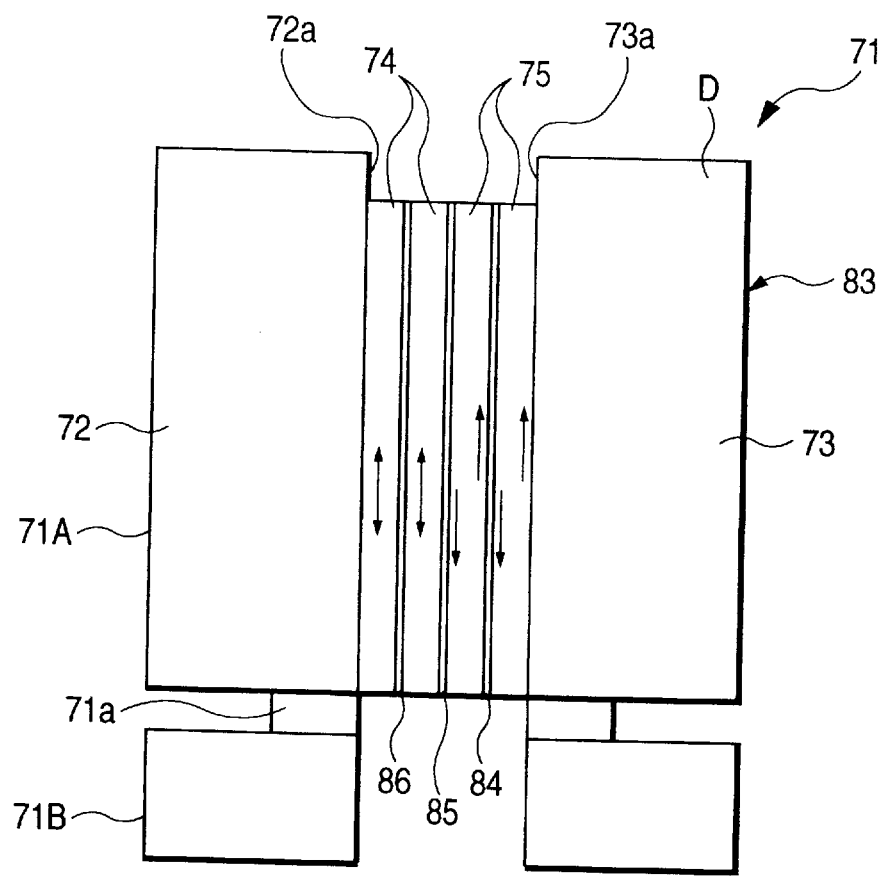
FIG. 14 is a lateral view of the vibration element of different-mode degenerate type, to be employed in the vibration actuator of the third embodiment.

Also as shown in FIGS. 13 and 14, the piezoelectric elements 74, 75 are provided in two layers each, or four layers in total, between divided faces 72a, 73a of the elastic halves. Among such four layers, the two layers 75 utilize the piezoelectric constant $d_{15}$ to generate a shear displacement in the longitudinal direction of the vibration element 71, while the other layers 74 utilize the piezoelectric constant $d_{31}$ to generate an elongation-contraction displacement in the longitudinal direction of the vibration element 71.

The elastic halves 72, 73 are provided, at the approximate center in the axial direction of the vibration element 71, with penetrating holes 72b, 73b in a direction parallel to the direction of lamination of the piezoelectric elements 74, 75 (lateral direction in FIG. 12).

Bolts 76, 77 are inserted into the penetrating holes 72b, 73b and screwed into screw holes 78b, formed in a larger diameter portion 78a of a fixed shaft 78 to be explained later, whereby the elastic halves 72, 73 hold the piezoelectric elements 74, 75 in a sandwiched state therebetween and the vibration element 71 is supported by the fixed shaft 78 passing through the axial center.

The fixed shaft 78 passes through an axial hollow portion 71b in the elastic halves 72, 73, thereby fixing the vibration element 71 as explained above, and also rotatably supports a movable element 79 to be explained later, defining the radial position thereof.

The cylindrical movable element 79, constituting the relative movement member, is composed of a thick-walled annular movable element body 79a, and a sliding member 79b adhered to an end face, opposed to the vibration element 71, of the movable element body 79a, and maintained in contact with the driving face D.

An end face of the movable element body 79a, opposed to the vibration element 71, is provided on the internal periphery with an annular groove 79c, in which fitted is a bearing 80 serving as the positioning member and mounted on the fixed shaft 78.

The movable element body 79a is provided on the external periphery thereof with an annular output gear (not shown), which meshes with a gear formed on an unrepresented driven member. Thus the output (rotating power) of the movable element 79 is transmitted to the driven member, which is thus driven.

The bearing 80 is pressed toward the vibration element 71, by means of a belleville spring 82 (or a coil spring or a plate spring) serving as a pressurizing member which is provided between the bearing 80 and a nut 81, constituting a pressure adjusting member and fitted on a screw portion 78c formed at the end of the fixed shaft 78, whereby the end face of the movable element 79, opposed to the vibration element, is maintained in contact, under a suitable pressure, with the driving face D of the vibration element 71. The pressure of the belleville spring 82 can be adjusted by varying the screwed position of the nut 81.

FIGS. 13 and 14 are respectively a plan view, seen from the side of the driving face, and a lateral view of the vibration element 71 to be employed in the ultrasonic actuator of the present embodiment.

An elastic member 83 is formed by combining the elastic halves 72, 73 obtained by longitudinally bisecting a hollow cylindrical elastic member along a plane containing the central axis, and the hollow cylindrical elastic member is provided with a smaller diameter portion 71a, on the lateral wall thereof.

The elastic member 83 is provided, on the external periphery thereof, with a first larger diameter portion 71A and a second larger diameter portion 71B, which are defined by the smaller diameter portion 71a. Thus the external periphery of the elastic member 83 is composed, in the axial direction thereof, of the first larger diameter portion 71A, the smaller diameter portion 71a and the second larger diameter portion 71B. The smaller diameter portion 71a is formed in order that the longitudinal vibration and the torsional vibration generated in the elastic halves 72, 73 have approximately same resonance frequencies.

Between divided faces 72a, 73a of the elastic halves 72, 73, in the areas axially corresponding to the first larger diameter portion 71A, there are sandwiched the piezoelectric elements 74, 75 and electrode plates 84, 85, 86 for driving voltage application thereto.

The piezoelectric elements 74, 75 mounted between the divided faces 72a, 73a are composed of two layers each or four layers in total. Among such four layers, the two-layered piezoelectric elements 75 utilize the piezoelectric constant $d_{15}$ to generate a shear displacement in the axial direction of the elastic member 83, while the remaining two-layered piezoelectric elements 74 utilize the piezoelectric constant $d_{31}$ to generate an elongation-contraction displacement in the axial direction of the elastic member 83.

Thus the piezoelectric elements 75 under the application of a driving voltage generates a torsional displacement, while the piezoelectric elements 74 under the application of a driving voltage generates a longitudinal displacement.

The piezoelectric elements 75 are so arranged that, for example under application of a certain positive voltage, the direction of shear deformation alternates upwards and downwards along the circumferential direction. It is preferable that the points showing the upward shear deformation are point symmetrical and the points showing the downward shear deformation are point symmetrical. Under the application of a negative voltage, the direction is shear deformation is reversed.

With the above-explained arrangement of the piezoelectric elements 75 for the torsional vibration and those 74 for the longitudinal vibration, the elastic member 83 generates a torsional vibration in response to a sinusoidal voltage supplied to the piezoelectric elements 75 and a longitudinal vibration in response to a sinusoidal voltage supplied to the piezoelectric elements 74.

Therefore, when two drive signals having a phase difference of (¼) λ respectively to the piezoelectric elements 75 for the torsional vibration and those 74 for the longitudinal vibration in the above-explained vibration actuator 70, the longitudinal vibration is directly generated by the piezoelectric elements 74 while the torsional vibration is generated by the shear deformation generated in the elastic member 83.

Thus, by the excitation of the piezoelectric elements 75 for the torsional vibration and those 74 for the longitudinal vibration with such drive signals, the elastic member 83 simultaneously generates the torsional vibration and the longitudinal vibration, which are synthesized to generate an elliptical movement on the driving face D.

Figure 15A:
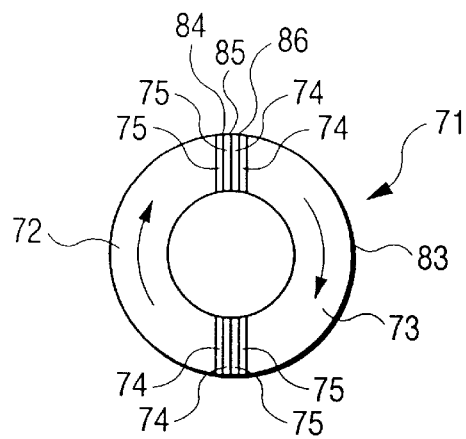
Figure 15B:
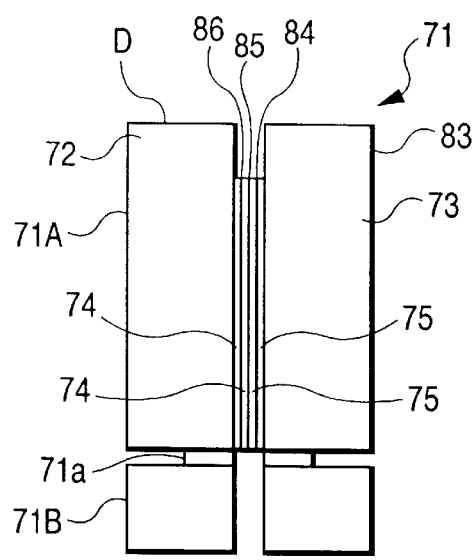
Figure 15C:
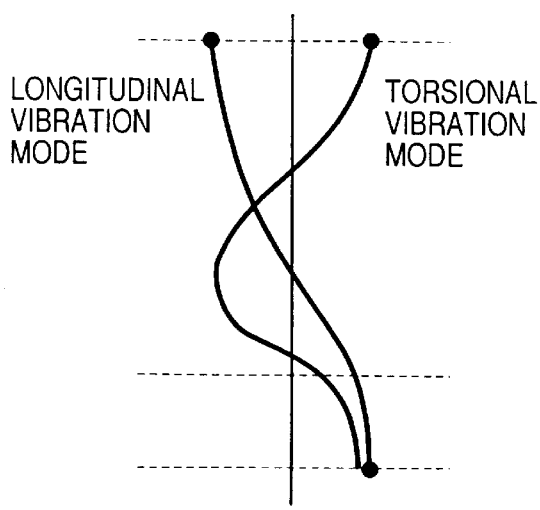

FIGS. 15A, 15B and 15C are views showing the generation of a first-order longitudinal vibration and a second-order torsional vibration in the vibration element 71 by the excitation of the piezoelectric elements 74, 75, wherein FIGS. 15A and 15B are respectively a plan view and a lateral view, and FIG. 15C is a chart showing the state of the generated torsional and longitudinal vibrations.

The elastic halves 72, 73 employed in the ultrasonic actuator of the present embodiment are provided with the first larger diameter portion 71A, the second larger diameter portion 71B and the smaller diameter portion 71a of a lower torsional rigidity provided therebetween.

Also in the ultrasonic actuator of the present embodiment, the axial length of the first larger diameter portion 71A is selected larger than that of the second larger diameter portion 71B.

Consequently, as shown in FIG. 15C, the generated torsional vibration becomes second-order, having two nodal points at the position of the smaller diameter portion 71a and at the approximate center of the first larger diameter portion 71A in the axial direction of the vibration element. On the other hand, the longitudinal vibration, being less susceptible to the shape factor of the smaller diameter portion 71a, becomes first-order having a nodal point at the approximate center of the entire length of the vibration element, including the first and second larger diameter portions 71A, 71B and the smaller diameter portion 71a.

Therefore, as shown in FIG. 15C, the second larger diameter portion 71B corresponds to the loops of the torsional and longitudinal vibrations.

In the present embodiment, as shown in FIGS. 15A to 15C, in the second larger diameter portion 71B and a portion of the first larger diameter portion 71A close to the driving face D, corresponding to the loops of the torsional and longitudinal vibrations, and not provided with the piezoelectric elements 74, 75 but left as empty gaps. Stated differently, the piezoelectric elements 74, 75 are positioned in the nodal points of the torsional and longitudinal vibrations and are not positioned in the loop positions of these vibrations.

Consequently the ultrasonic actuator of the present embodiment can reduce the mounted area, requiring voltage application, of the piezoelectric elements 74, 75, thereby reducing the electrostatic capacitance thereof.

The input current of the ultrasonic actuator 70, at the driving point (close to the antiresonance point), can be given by the aforementioned approximation equation (1).

Therefore, the elimination of the piezoelectric elements 74, 75 from the loop positions of the torsional and longitudinal vibrations, not contributing much to the generation of vibration, allows to reduce both the electrostatic capacitance of the piezoelectric elements 74, 75 and the input current thereto.

Such arrangement scarcely decreases the output of the ultrasonic actuator, since the piezoelectric elements 74, 75 are positioned in the nodal point of the longitudinal vibration. It is therefore rendered possible to improve the driving efficiency of the ultrasonic actuator, determined by the output thereof and the input power thereto.

Thus, since the piezoelectric elements 74, 75 are provided in non-loop positions of the first-order longitudinal vibration and the second-order torsional vibration, the ultrasonic actuator 70 of the present embodiment can reduce the input energy almost without loss in the output, thereby improving the driving efficiency.

Also in the ultrasonic actuator 70 of the present embodiment, since the piezoelectric elements 74, 75 are not provided at the end portions of the elastic halves 72, 73 corresponding to the loops of the first-order longitudinal vibration and the second-order torsional vibration, the input energy can be reduced almost without loss in the contribution to the elliptical movement in the end face, whereby the driving efficiency can be improved.

[Fourth Embodiment]

As a result of further investigation by the present inventors, it has been found that the configuration of the third embodiment shown in FIG. 14, in which the piezoelectric elements 74, 75 are provided only in a part of the first larger diameter portion 71A but not in the second larger diameter portion 71B in consideration only of the vibration generating efficient, reduces the adhesion area between the piezoelectric elements 74, 75 and the elastic halves 72, 73 thereby deteriorating the mechanical strength of the elastic halves 72, 73. Such decrease in the adhesion area leads to a lowered durability of the vibration actuator 70, thus significantly limiting the field of application thereof.

Also the shear deformation generated in the piezoelectric elements 75 for the torsional vibration induces a shear deformation also in the elastic halves 72, 73. However, in such case, the elastic halves 72, 73 tend to generate a displacement as shown in FIG. 16B, rather than the torsional displacement, whereby the driving characteristics of the vibration actuator 70 are deteriorated.

Figure 16A:
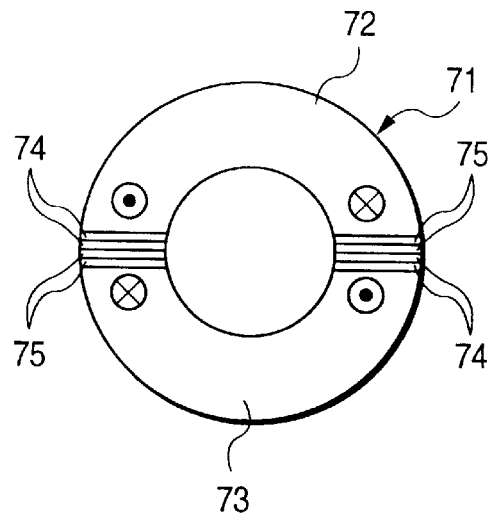
FIGS. 16A and 16B are views showing a case where the vibration element is not deformed in the torsional direction but in the axial direction.
Figure 16B:
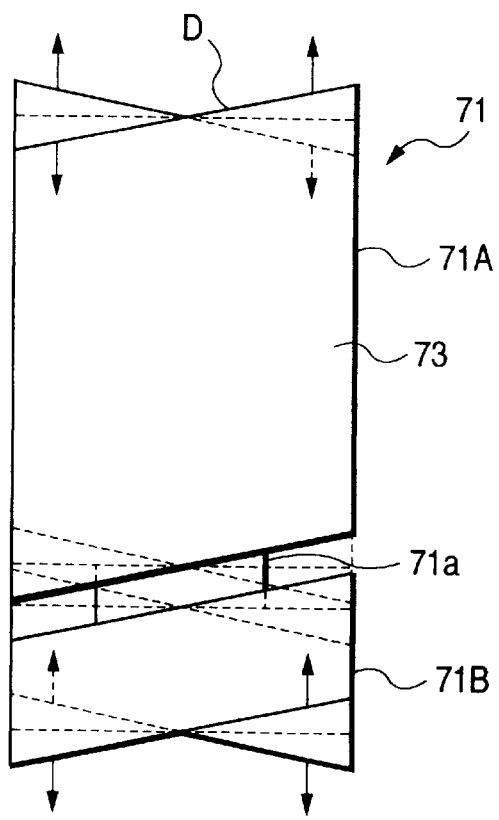

FIGS. 16A and 16B are respectively a plan view and a lateral view of the vibration element 71, showing the state of deformation of the elastic halves 72, 73 when a torsional deformation is generated.

If the second larger diameter portion 71B is not provided with the piezoelectric elements 74, 75 but a gap is formed instead, the vibration element 71 generates an axial displacement starting from the smaller diameter portion 71a when the piezoelectric elements 75 for the torsional vibration generate the shear deformation, as shown in FIGS. 16A and 16B. Consequently the vibration element 71 is no longer in contact with the unrepresented movable element by a plane but only in points, whereby the driving efficiency of the vibration actuator 70 becomes deteriorated.

The present fourth embodiment will be explained by an ultrasonic actuator, which is a vibration actuator utilizing the vibrations in the ultrasonic frequency range.

Figure 17:
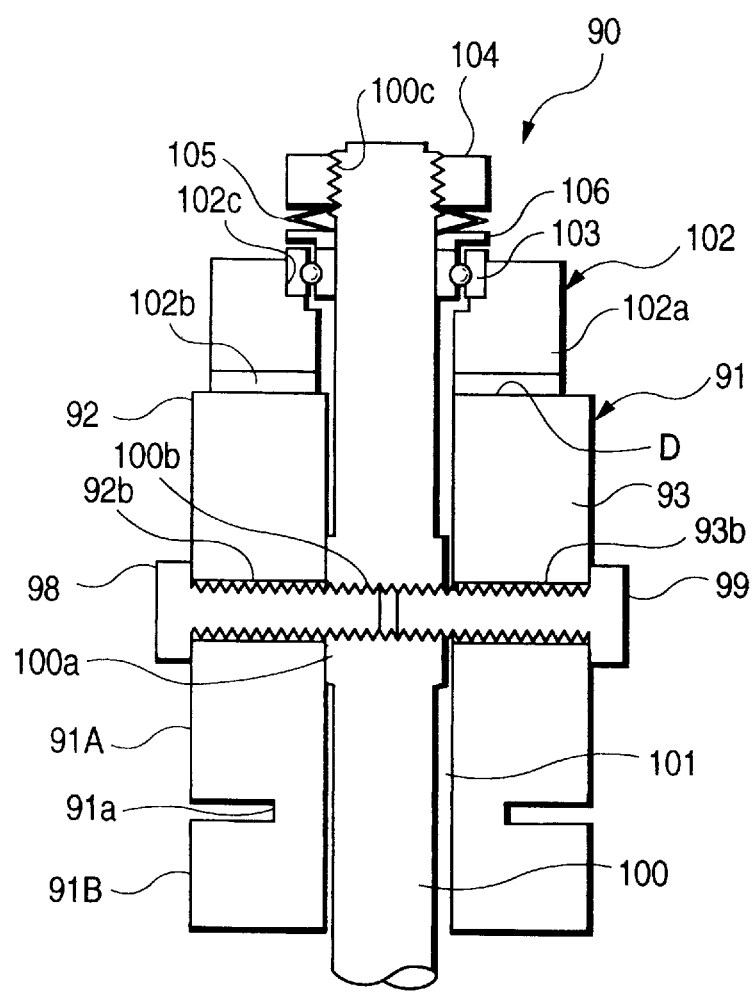
FIG. 17 is a longitudinal cross-sectional view of an ultrasonic actuator constituting a fourth embodiment of the vibration actuator of the present invention.

FIG. 17 is a longitudinal cross-sectional view of an ultrasonic actuator, constituting the fourth embodiment of the vibration actuator of the present invention.

Figure 18:
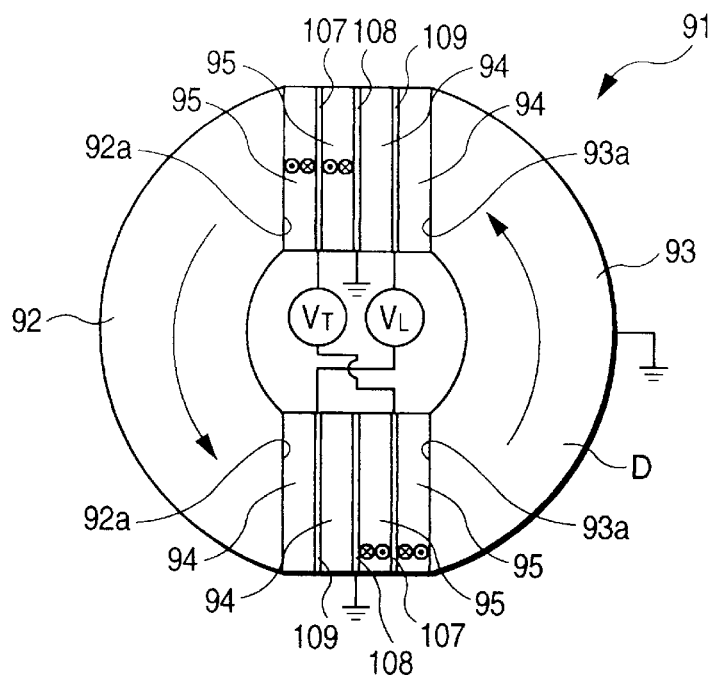
FIG. 18 is a plan view, seen from above the driving face, of the vibration element in the fourth embodiment.

As shown in FIG. 18, a vibration element 91 is principally composed of piezoelectric elements 94, 95 which are thin plate-shaped rectangular electromechanical converting elements to be excited by drive signals, and hollow cylindrical elastic halves 92, 93 to which the piezoelectric elements 94, 95 are adhered and which generates, by the excitation of the piezoelectric elements 94, 95, a first-order longitudinal vibration and a second-order torsional vibration which are synthesized to generate a driving force by an elliptical movement on a driving end face D.

The elastic halves 92, 93 can be obtained by longitudinally bisecting a thick-walled hollow cylindrical elastic member with a plane passing through the central axis, and the vibration element 91 can be composed by adhering the elastic halves 92, 93 at the divided faces thereof.

The elastic halves 92, 93 are provided, on the external periphery thereof and along the axial direction thereof, with a first larger diameter portion 91A, and a second larger diameter portion 91B and a smaller diameter portion 91a positioned therebetween, with stepwise change in diameter. The axial length of the first larger diameter portion 91A is selected larger than that of the second larger diameter portion 91B. The first larger diameter portion 91A, the second larger diameter portion 91B and the smaller diameter portion 91a are provided in order to mutually match the resonance frequencies of the longitudinal and torsional vibrations generated in the elastic halves 92, 93.

Figure 19:
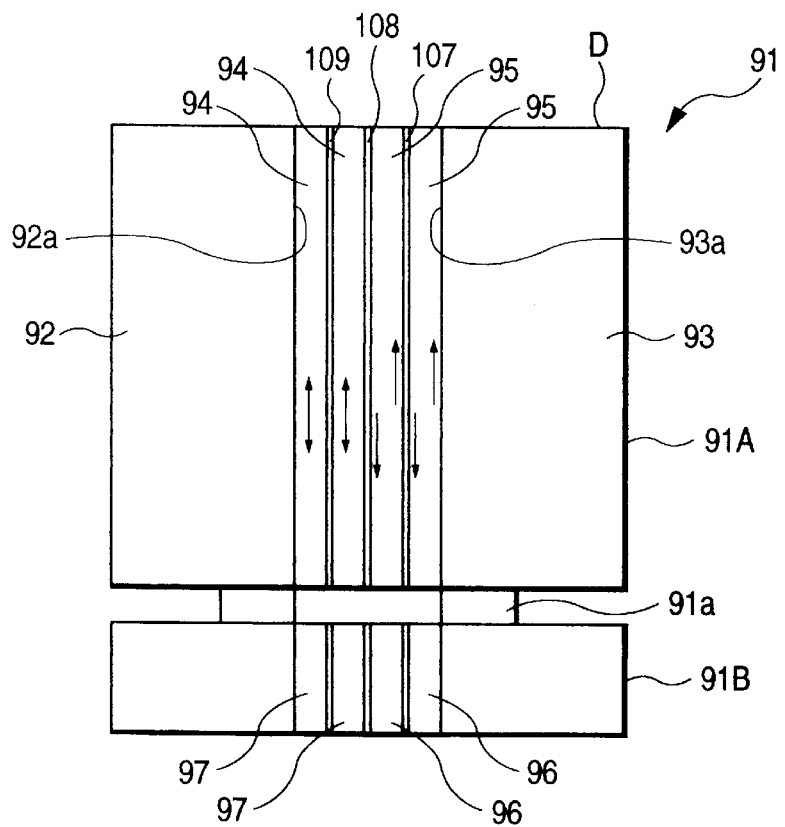
FIG. 19 is a lateral view of the vibration element in the fourth embodiment.

In a range, corresponding to the first larger diameter portion 91A, of the divided faces 92a, 93a of the elastic halves 92, 93, piezoelectric elements 94, 95 for generating vibrations are sandwiched in a superposed state, as shown in FIG. 19. These piezoelectric elements 94, 95 are composed of four layers, of which two are the piezoelectric elements 95 for the torsional vibration, so polarized as to utilize the piezoelectric constant $d_{15}$, while the remaining two are the piezoelectric elements 94 for the longitudinal vibration, so polarized as to utilize the piezoelectric constant $d_{31}$. The arrangement of the piezoelectric elements 94, 95 between the elastic halves 92, 93 will be explained later with reference to FIGS. 18 and 19.

In the vibration actuator 90 of the present embodiment, in a range corresponding to the second larger diameter portion 91B, there are mounted, as shown in FIG. 19, detecting piezoelectric elements 96, 97 serving as mechanoelectrical converting elements for converting a mechanical displacement into electrical energy.

The two elastic halves 92, 93 are provided, at the approximate center of the height thereof, with penetrating holes 92b, 93b in a direction of lamination of the piezoelectric elements 94, 95. The two elastic halves 92, 93 are mutually coupled by inserting bolts 98, 99 into the penetrating holes 92b, 93b of the halves 92, 93 with their divided faces 92a, 93a in mutually opposed state and screwing these bolts 98, 99 into a larger diameter portion 100a of a fixed shaft 100 to be explained later.

The piezoelectric elements 94, 95 are supported in sandwiched state by the divided faces 92a, 93a of the two elastic halves 92, 93.

In a hollow portion 101 formed at the center of the elastic halves 92, 93, there is inserted a circular rod-shaped fixed shaft 100, which fixes the vibration element 91 composed of the elastic halves 92, 93 etc. and rotatably supports a movable element 102. A larger diameter portion 100a of the fixed shaft 100 is provided with amounting hole 100b, in which the aforementioned bolts 98, 99 are to be screwed, in a direction perpendicular to the axial direction, and the elastic halves 92, 93 are fixed to the fixed shaft 100 by the bolts 98, 99 which pass through the penetrating holes 92b, 93b of the elastic halves 92, 93 and are screwed into the mounting hole 100b.

The movable element 102, constituting the relative movement member, is composed of a thick-walled annular movable element body 102a, and a sliding member 102b adhered to an end face, opposed to the vibration element 91, of the movable element body 102a, and is rotatably maintained in contact with a driving face D, which is an end face of the elastic halves 92, 93.

An end face of the movable element body 102a, opposite to the vibration element 91, is provided at the center with an annular groove 102c, in which fitted is a bearing 103 serving as the positioning member and mounted on the fixed shaft 100, whereby the movable element 102 is rotatably supported by the fixed shaft 100.

The movable element body 102a is provided on the external periphery thereof with an annular output gear (not shown), which meshes with a gear formed on an unrepresented driven member. Thus the output (rotating power) of the movable element 102 is transmitted to the driven member, which is thus driven.

The fixed shaft 100 is provided at the end thereof with a screw portion 100c, on which fitted is a nut 104 serving as a pressure adjusting member. Between the nut 104 and the bearing 103, there is provided a belleville spring 105 (or a coil spring or a place spring) serving as a pressurizing member, whereby the end face of the movable element 102, opposed to the vibration element, is maintained in contact, under a suitable pressure, with the driving face D of the elastic halves 92, 93 through a pressure transmitting member 106, consisting of a cylindrical member with an outer flange.

The pressure of the belleville spring 105 to the movable element 102 can be adjusted by regulating the screwed position of the nut 104.

FIGS. 18 and 19 are respectively a plan view, seen from the side of the driving face, and a lateral view of the elastic halves 92, 93, showing detailed arrangement of the piezoelectric elements 94, 95.

On the divided faces 92a, 93a of the elastic halves 72, 73 obtained by longitudinally bisecting a thick-walled hollow cylindrical elastic member along a plane containing the central axis, in a range corresponding to the first larger diameter portion 91A, the piezoelectric elements 94, 95 for generating the vibrations and electrode plates 107, 108, 109 for input/output of electrical energy therefor are supported in sandwiched state.

The piezoelectric elements 94, 95 for generating vibrations are composed of two groups, each of which has four layers. Among these, two layers are composed of the piezoelectric elements 95 utilizing the piezoelectric constant $d_{15}$, while the remaining two layers are composed of the piezoelectric elements 94 utilizing the piezoelectric constant $d_{31}$.

The piezoelectric elements 95 generate shear displacements in the longitudinal direction of the elastic halves 92, 93. The piezoelectric elements 95 are so arranged that, for example under application of a positive voltage, the direction of shear deformation alternates upwards and downwards along the circumferential direction as shown in FIG. 18. It is preferable that the points showing the maximum upward shear deformation are point symmetrical and the points showing the maximum downward shear deformation are point symmetrical, in order to increase the amplitude of the torsional displacement generated on the driving face D. With such arrangement of the piezoelectric elements 95, the vibration element 91 generates a torsional displacement, whereby the end face containing the driving face D is twisted. Under the application of a negative voltage, the direction is shear deformation is reversed, whereby the driving face D is twisted in the opposite direction.

The piezoelectric elements 94 generate an elongation-contraction displacement in the longitudinal direction of the elastic halves 92, 93. Four piezoelectric elements 94 are so arranged to generate displacements in a same direction, under the application of a certain voltage.

With the above-explained arrangement of the piezoelectric elements 95 utilizing the piezoelectric constant $d_{15}$ and generating the torsional vibration and those 94 utilizing the piezoelectric constant $d_{31}$ and generating the longitudinal vibration, the vibration element 91 generates a torsional movement in response to a sinusoidal voltage applied to the piezoelectric elements 95 and a longitudinal movement in response to a sinusoidal voltage applied to the piezoelectric elements 94.

In the present embodiment, as shown in FIGS. 18 and 19, four piezoelectric elements 96, 97 for detecting the vibrations, serving as the mechanoelectrical converting elements for converting the mechanical displacement into electrical energy, are supported in sandwiched state in a range corresponding to the second larger diameter portion 91B.

In such range corresponding to the second larger diameter portion 91B, namely at an end opposite to the driving face D, there exist loops of the longitudinal and torsional vibrations, and the piezoelectric elements 96, 97 are provided in the vicinity of such loops.

The vicinity of the loops means an area where a piezoelectric element, even if present, cannot contribute much to the generation of the vibration.

The piezoelectric elements 96, 97 are composed of those utilizing the piezoelectric constant $d_{15}$ and those utilizing the piezoelectric constant $d_{31}$, which respectively detect the states of the torsional and longitudinal vibrations generated in the elastic member.

Therefore, when two drive signals having a phase difference of (¼) λ (λ: wavelength) respectively to the piezoelectric elements 95 for the torsional vibration and those 94 for the longitudinal vibration in the above-explained vibration actuator 90, the longitudinal vibration is directly generated by the piezoelectric elements 94 while the torsional vibration is generated by the shear deformation. Thus, in response to such drive signals, the vibration element 91 simultaneously generates, by the excitation of the piezoelectric elements 94, 95, a longitudinal vibration and a torsional vibration, which are synthesized to generate an elliptical movement on the driving face D.

Figure 20A:
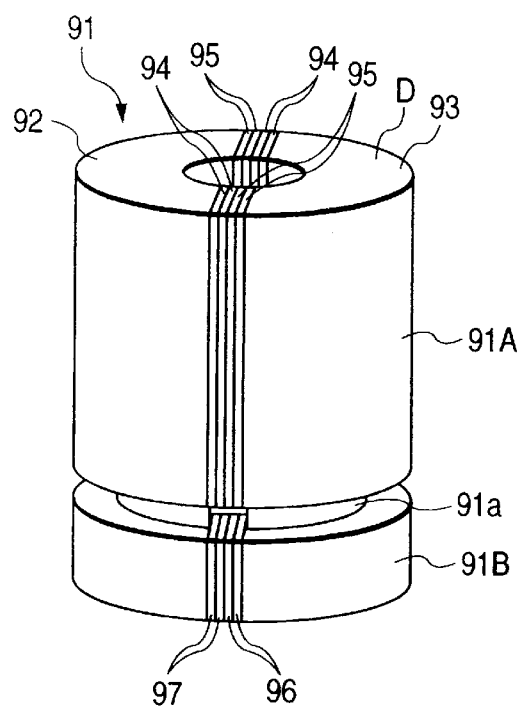
Figure 20B:
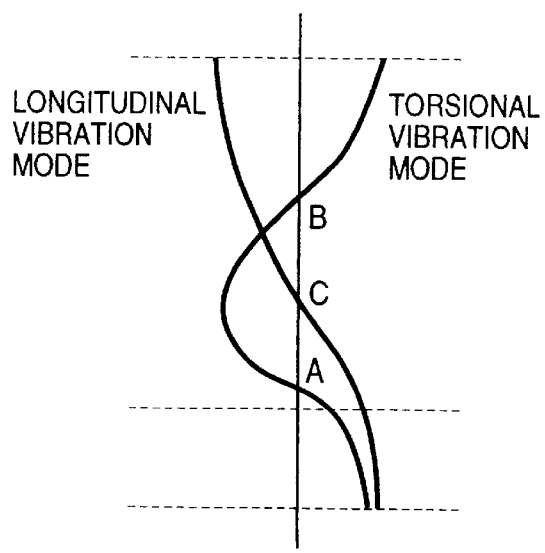

FIGS. 20A and 20B are schematic views showing generation of a first-order longitudinal vibration and a second-order torsional vibration in the vibration element 91, wherein FIG. 20A is a perspective view of the vibration element 91 while FIG. 20B is a chart showing the state of generation of the longitudinal and torsional vibrations in the vibration element 91.

The vibration element 91, employed in the ultrasonic actuator 90 of the present embodiment, is provided, as shown in FIG. 20A, with a first larger diameter portion 91A, a second larger diameter portion 91B and a smaller diameter portion 91a of a lower rigidity, provided therebetween, wherein the axial length of the first larger diameter portion 91A is selected significantly larger than that of the second larger diameter portion 91B.

Consequently, the torsional vibration generated in the vibration element 91 assumes the second-order mode having two nodal points at a position approximately corresponding to the smaller diameter portion 91a and a position at the approximate center B of the axial length of the first larger diameter portion 91A in FIG. 20B. On the other hand, the longitudinal vibration generated in the vibration element 91, being significantly influenced by the entire axial length thereof but not much influenced by the presence of the smaller diameter portion 91a, assumes the first-order mode having only one node at the approximate center C of the entire axial length of the vibration element 91 including the first and second larger diameter portions 91A, 91B and the smaller diameter portion 91a. Therefore the second larger diameter portion 91B corresponds to the loops of the longitudinal and torsional vibrations.

It is thus rendered possible to reduce the input electrical energy to the second larger diameter portion 91B contributing less to the generation of vibrations and to improve the driving efficiency based on such reduction of the input energy, by providing the first larger diameter portion 91A with the piezoelectric elements 94, 95 for generating vibrations and the second larger diameter portion 91B with other reinforcing members (detecting piezoelectric elements or pickups 96, 97 in the present embodiment). Also in comparison with the configuration of leaving a gap corresponding to the second larger diameter portion 91B which contributes little to the generation of vibrations, the present embodiment allows to maintain the mechanical strength of the vibration element 91 and to improve the durability thereof.

Furthermore, the configuration with the gap corresponding to the second larger diameter portion 91B, instead of the pickup elements 96, 97 of the present embodiment, tends to generate a vibration explained in relation to FIG. 16B, thereby deteriorating the driving efficiency. In contrast, the configuration of the present embodiment, utilizing the vibration detecting piezoelectric elements 96, 97 in the second larger diameter portion 91B also for reinforcing the torsional rigidity of the vibration element 91, becomes easier to generate a torsional vibration in the direction perpendicular to the axial direction of the vibration element 91, thereby stabilizing the contact between the vibration element 91 and the movable element 102 and improving the driving characteristics of the vibration actuator.

Furthermore, the present embodiment can detect the state of vibrations generated in the vibration element 91, owing to the presence of the vibration detecting piezoelectric elements (pickups) 96, 97 in the second larger diameter portion 91B, serving also for mechanical reinforcement, and such detection of the vibration state enables more exact drive control of the ultrasonic actuator 90.

Furthermore, the vibration detecting piezoelectric elements 96, 97 are positioned in the vicinity of the loops of the longitudinal and torsional vibrations, where the mechanical distortions by such vibrations are not very large. Consequently the loss in the vibration energy is smaller when the piezoelectric elements 96, 97 are provided in such position, in comparison with a case if they are provided at the loops of the longitudinal and torsional vibrations. It is therefore rendered possible to exactly detect the vibrations generated in the vibration element 91, with scarce deterioration in the driving efficiency.

[Fifth Embodiment]

Figure 21:
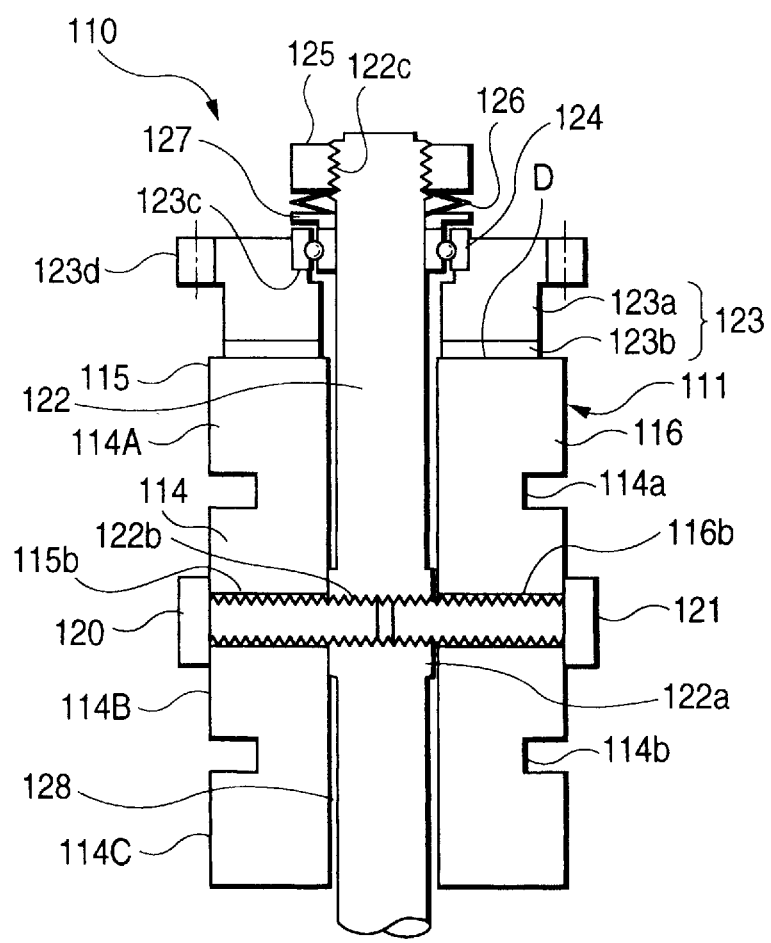
FIG. 21 is a longitudinal cross-sectional view of an ultrasonic actuator constituting a fifth embodiment of the present invention.

FIG. 21 is a longitudinal cross-sectional view of an ultrasonic actuator 110 constituting a fifth embodiment of the present invention, which is different from the ultrasonic actuator 90 of the foregoing fourth embodiment in the presence of two smaller diameter portions in a vibration element 111, in the arrangement of the piezoelectric elements and in that mechanoelectrical converting elements are positioned at the loops of the longitudinal and torsional vibrations.

Figure 22A:
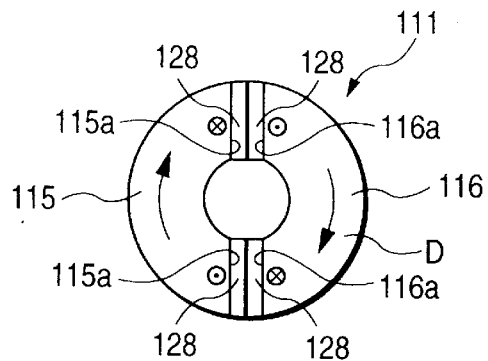
Figure 22B:
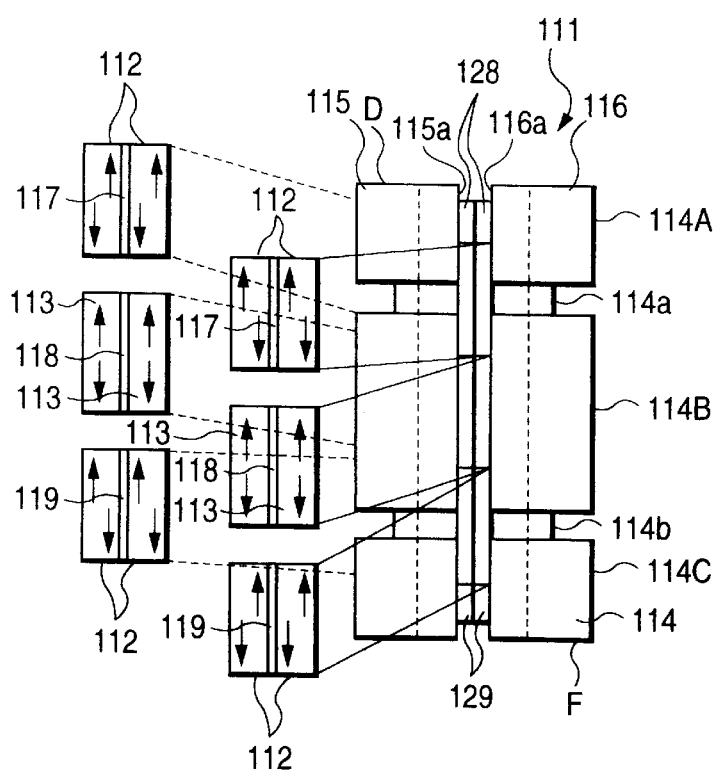

As shown in FIG. 22B, the vibration element 111 is composed of piezoelectric elements 112, 113 constituting electromechanical converting elements to be excited by drive signals, and a hollow cylindrical elastic member 114 to which the piezoelectric elements 112, 113 are adhered and which generates a first-order longitudinal vibration and a second-order torsional vibration by the excitation thereof to generate a driving force on a driving face D.

Figure 22C:
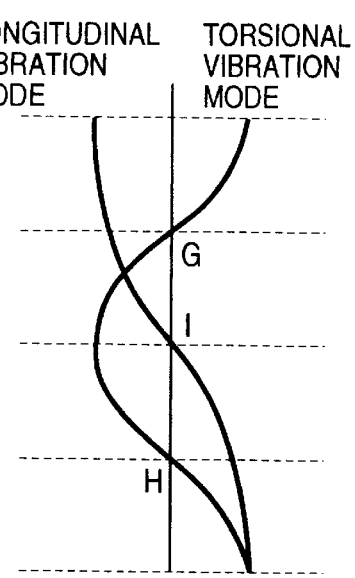

FIGS. 22A, 22B and 22C are views showing the details of the vibration element 111 to be employed in the ultrasonic actuator of the present embodiment, wherein FIGS. 22A is a plan view of the vibration element, FIG. 22B is a lateral view thereof showing the mounting state of the piezoelectric elements 112, 113, and FIG. 22C is a chart showing the state of the torsional and longitudinal vibrations generated in the vibration element 111.

The elastic member 114 is composed of a metal such as steel, phosphor bronze or stainless steel, and is formed by combining two elastic halves 115, 116 obtained by longitudinally bisecting a hollow cylindrical elastic member, provided on the external periphery thereof with three larger diameter portions 114A, 114B, 114C and two smaller diameter portions 114a, 114b, with a plane containing the central axis. Between the divided faces 115a, 115b of the two elastic halves 115, 116, there are sandwiched piezoelectric elements 112, 113 formed in two layers and three groups and electrodes 117, 118, 119 for electrical energy input/output for the piezoelectric elements 112, 113.

The smaller diameter portions 114a, 114b are provided at the nodes of the torsional vibration generated in the elastic member 114, and the piezoelectric elements 112 for the torsional vibration are provided in positions including the two nodes of the torsional vibration. On the other hand, the piezoelectric elements 113 for the longitudinal vibration are provided in positions including the one node of the longitudinal vibration.

The two elastic halves 115, 116 are provided, at the approximate center of the axial length of the vibration element, with penetrating holes 115b, 116b in a direction of lamination of the piezoelectric elements 112, 113. The two elastic halves 115, 116 support the piezoelectric elements 112, 113 therebetween and are fixed to a fixed shaft 122 inserted at the axial center, by inserting bolts 120, 121 into the penetrating holes 115b, 116b of the halves 115, 116 and screwing these bolts 120, 121 into a screw hole 122b formed in a larger diameter portion 100a at the approximate center of the fixed shaft 122 to be explained later.

The movable element 123, constituting the relative movement member, is composed of a thick-walled annular movable element body 123a, and a sliding member 123b adhered to an end face, closer to the vibration element, of the movable element body 123a, and is maintained in contact with a driving face D of the vibration element 111. The sliding member 123b is preferably composed of a hard polymer material, for example a composite material such as PEEK (70 wt. %)—carbon fibers (20 wt. %)—PTFE (10 wt. %). An end face of the movable element body 123a, opposite to the vibration element, is provided at the internal periphery with an annular groove 123c, in which fitted is a bearing 124 serving as the positioning member and mounted on the fixed shaft 122, whereby the movable element 123 is rotatably supported by the fixed shaft 122.

The movable element body 123a is provided on the external periphery thereof with an annular output gear 123d, which meshes with a gear formed on an unrepresented driven member. Thus the output power of the movable element 123 is transmitted to the driven member, which is thus driven.

The fixed shaft 122 is provided at the end thereof with a screw portion 122c, on which fitted is a nut 125 serving as a pressure adjusting member. Between the nut 125 and the bearing 124, a belleville spring 126 (or a coil spring or a plate spring) serving as a pressurizing member is supported by the fixed shaft 122, whereby the movable element 123 is maintained in pressure contact with the driving face D of the vibration element 111 through a pressure transmitting member 127, consisting of a flanged cylindrical member.

Thus the fixed shaft 122 passes through a hollow portion 128 formed in the elastic halves 115, 116 along the axial direction thereof, fixed the vibration element 111 consisting of the elastic halves 115, 116 etc. and rotatably supports the movable element 123, defining the radial position thereof.

The elastic halves 115, 116 can be obtained by longitudinally bisecting a thick-walled hollow cylindrical member having three larger diameter portions 114A, 114B, 114C and two smaller diameter portions 114a, 114b with a plane containing the central axis, and, between the divided faces 115a, 116a, there are sandwiched the piezoelectric elements 112, 113 provided in two layers and three groups and the electrodes 117, 118, 119.

The smaller diameter portions 114a, 114b are provided at the nodes of the torsional vibration. The piezoelectric elements 112 for the torsional vibration are positioned at the nodes of the torsional vibration, whereby the vibration element 111 generates a torsional vibration.

The piezoelectric elements 112 for the torsional vibration generate shear deformations according to the direction of an applied AC voltage, and the torsional vibration is generated by such shear deformations.

A first group of the piezoelectric elements 112 for the torsional vibration is composed of two piezoelectric elements 112 positioned in front in the illustration and two piezoelectric elements 112 positioned at the rear, which are so arranged as to generate the shear deformations in mutually opposite directions in response to an applied voltage of a same direction, whereby the vibration element 111 generates a torsional displacement in a certain direction.

For example, if the two piezoelectric elements 112 in front and the two piezoelectric elements 112 positioned at the rear respectively generate shear deformations as shown in FIG. 22A, the driving face D is twisted as indicated by arrows therein. Also in response to a voltage in the opposite direction, the direction of the shear deformations is reversed, whereby the driving face D is twisted in a direction opposite to the arrows in FIG. 22A.

A second group of the piezoelectric elements 112 for the torsional vibration is composed of two piezoelectric elements 112 positioned in front in the illustration and two piezoelectric elements 112 positioned at the rear, which are so arranged as to generate the shear deformations in mutually opposite directions in response to an applied voltage of a same direction, whereby the vibration element 111 generates a torsional displacement in a certain direction.

The two piezoelectric elements 112 in front in the first group and the two piezoelectric elements 112 in front in the second group are so arranged as to generate shear deformations in respectively different directions, in response to an applied voltage of a same direction.

Also the two piezoelectric elements 112 at the rear in the first group and the two piezoelectric elements 112 at the rear in the second group are so arranged as to generate shear deformations in respectively different directions, in response to an applied voltage of a same direction.

For example, if the two piezoelectric elements 112 in front in the second group and the two piezoelectric elements 112 positioned at the rear in the second group respectively generate shear deformations as shown in FIG. 22A, an end face F opposite to the driving face D is twisted in a direction same as the arrows therein.

When a same AC voltage (frequency voltage) is applied to the first and second groups of the piezoelectric elements 112 for the torsional vibration arranged as explained above, the direction of the torsional vibration above the first node G becomes same as that above the second node H, whereby the generation of the torsional vibration of the second mode is facilitated.

Also referring to FIGS. 22A, 22B and 22C, the piezoelectric elements 113 for longitudinal vibration generate an elongation-contraction deformation in response to an applied AC voltage, thereby generating a longitudinal vibration.

The piezoelectric elements 113 for the longitudinal vibration are composed of two piezoelectric elements 113 in front and two piezoelectric elements 113 at the rear, which are so arranged as to generate a longitudinal deformation in a same direction, in response to an applied voltage of a same direction.

Thus, when a same AC voltage (frequency voltage) is applied to the piezoelectric elements 113 for the longitudinal vibration arranged in the above-explained manner, the generation of the longitudinal vibration of the first-order mode is facilitated.

When two drive signals, having a mutual phase difference of $(¼)\lambda$ are respectively applied to the piezoelectric elements 113 for the longitudinal vibration and those 112 for the torsional vibration in the ultrasonic actuator 110 of the above-explained configuration, there are generated a longitudinal vibration and a torsional vibration with a mutual phase difference of 90°, which are synthesized to generate an elliptical movement on the driving face D of the vibration element 111.

In the present embodiment, as shown in FIG. 22B, at both ends of the piezoelectric elements 112 of two groups, namely in the vicinity of the loops of the longitudinal and torsional vibrations generated in the vibration element 111, there are provided vibration detecting piezoelectric elements 128, 129 serving as mechanoelectrical converting elements for converting the mechanical displacement into electrical energy, instead of the piezoelectric elements for converting the electrical energy into mechanical displacement. Such vibration detecting piezoelectric elements 128, 129 do not receive the driving voltage but generate electrical energy according to the mechanical displacements generated in the vibration element 111.

Consequently, as in the foregoing fourth embodiment, the present embodiment allows to reduce the electrostatic capacitance of the piezoelectric elements 112, 113, thereby reducing the required input electric power, owing to the absence of the piezoelectric elements 112, 113 in the loop positions of the vibrations, that do not contribute much to the generation of vibrations.

The vibration detecting piezoelectric elements 128, 129 are positioned in the vicinity of the loops of the longitudinal and torsional vibrations, where the mechanical distortions by such vibrations are not very large. Consequently the loss in the vibration energy is significantly smaller when the piezoelectric elements 128, 129 are provided in such position, in comparison with a case if they are provided at the loops of the longitudinal and torsional vibrations. It is therefore rendered possible to exactly detect the vibrations generated in the elastic halves 115, 116, with scarce deterioration in the driving efficiency of the ultrasonic actuator.

Also the presence of the vibration detecting piezoelectric elements 128, 129, instead of a gap, in the vicinity of the loop positions of the longitudinal and torsional vibrations in the vibration element 111 increases the torsional rigidity thereof, thereby maintaining the mechanical strength thereof and improving the durability thereof.

If the mechanoelectrical converting elements 128, 129 serving also for mechanical reinforcement are not provided in the vicinity of the driving face D and the opposite end face F, the shear deformations of the piezoelectric elements 112 for the torsional vibration give rise to an axial deformation as shown in FIG. 16B instead of the desired torsional displacement. The present embodiment, owing to the presence of the vibration detecting piezoelectric elements 128, 129 in such positions, facilitates the generation of the desired torsional deformation in the vibration element 111, thereby improving the driving characteristics.

Also the presence of the vibration detecting piezoelectric elements 128, 129 in the sandwiched state enables exact detection of the vibrations generated in the elastic member 114, thereby allowing easy and exact drive control of the ultrasonic actuator 110.

The vibration detecting piezoelectric elements 128, 129 are positioned in the vicinity of the loops of the longitudinal and torsional vibrations, where the mechanical distortions by such vibrations are not very large. Consequently the loss in the vibration energy is smaller when the piezoelectric elements 128, 129 are provided in such position, in comparison with a case if they are provided at the loops of the longitudinal and torsional vibrations. It is therefore rendered possible to exactly detect the vibrations generated in the elastic member 114, without deterioration in the driving efficiency.

In the present embodiment, the piezoelectric element for the torsional vibration, that for the longitudinal vibration and that for detecting vibration, positioned on a same plane, are assumed to be composed of separate members, but they may also be composed of an integral member. In such a single piezoelectric element may be employed and the polarizing direction thereof may be varied corresponding to various portions. More specifically, a portion for generating the torsional vibration is to be so polarized as to generate a torsional vibration in the elastic members by the piezoelectric constant $d_{15}$, and a portion for generating the longitudinal vibration is to be so polarized as to generate a longitudinal vibration in the elastic members by the piezoelectric constant $d_{31}$. Also the vibration detecting portions are to be so polarized as to utilizing the piezoelectric constant $d_{15}$ or $d_{31}$. The use of such single integral piezoelectric element allows to simplify the assembling steps, and to decrease the number of adhered points, thereby reducing the attenuation of vibrations.

In the present embodiment explained above, the electromechanical converting elements and the mechanoelectrical converting elements are assumed to be composed of piezoelectric elements, but the present invention is not limited to such case and can employ any element capable of mutual conversion of the mechanical displacement and the electrical energy. An example of such element, other than the piezoelectric element, is an electrostriction element.

Also in the present embodiment, there has only been explained a case where the vibration element generates a second-order torsional vibration and a first-order longitudinal vibration, but the present invention is not limited to such case. For example, in a vibration actuator provided with electromechanical converting elements positioned between two divided elastic members and adapted to generate an n-th order longitudinal vibration and an m-th order torsional vibration by the application of driving voltages to such electromechanical converting elements, thereby obtaining a driving force by the synthesized vibrations, the present invention can achieve improvements in the mechanical strength, driving efficiency and driving controllability as in the present embodiment, by positioning such electromechanical converting elements in the vicinity of the loops of the longitudinal and torsional vibrations.

Also in the present embodiment, the vibration detecting piezoelectric elements are provided at both ends of the vibration generating piezoelectric elements (close to the driving face and the opposite end face), but the present invention is not limited to such arrangement, and the piezoelectric elements for detecting the vibrations may be provided between the piezoelectric elements for the longitudinal vibration and those for the torsional vibration. The positions between the piezoelectric elements for the longitudinal vibration and those for the torsional vibration also correspond to the vicinity of the loops of the longitudinal and torsional vibrations, there can be attained the effects of the present invention such as the improvement in the driving efficiency resulting from the reduced input energy, the improvement in the mechanical strength of the vibration element and the detection of the vibration generated in the vibration element, in the same manner as in the ultrasonic actuator of the present embodiment.

[Sixth Embodiment]

Figure 23A:
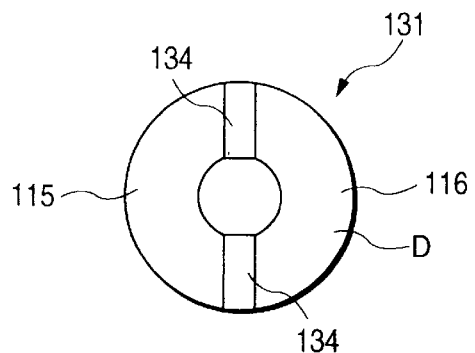
Figure 23B:
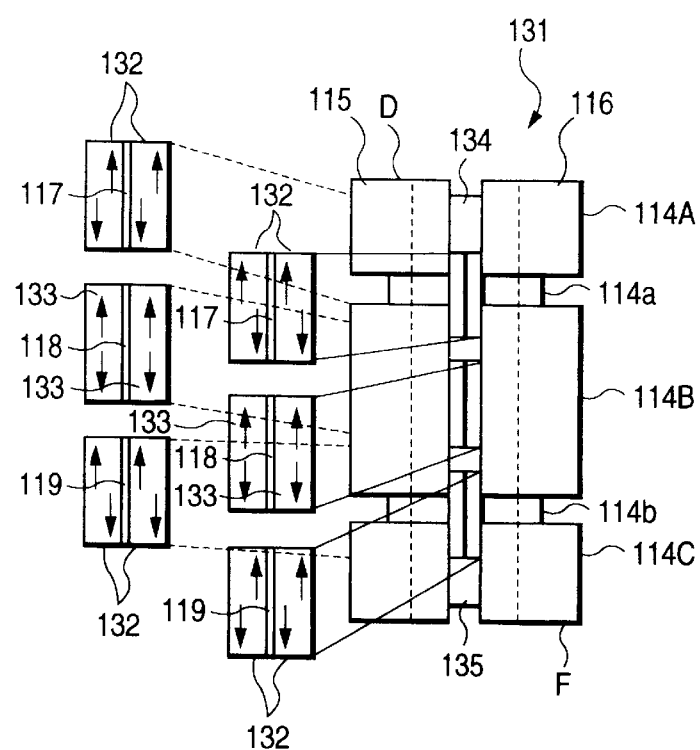
Figure 23C:
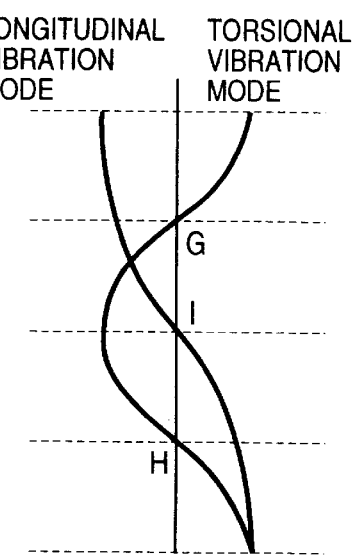

FIGS. 23A, 23B and 23C illustrate an ultrasonic actuator constituting a sixth embodiment of the present invention, wherein FIG. 23A is a plan view of a vibration element 131, FIG. 23B is a lateral view of the vibration element 131 showing the arrangement of piezoelectric elements 132, 133, and FIG. 23C is a chart showing the state of the longitudinal and torsional vibrations generates in the vibration element 131.

The ultrasonic actuator of the present embodiment is different from that of the fifth embodiment in that reinforcing members 134, 135 are positioned, instead of the vibration detecting piezoelectric elements 128, 129, on both ends of the two piezoelectric elements 132 for the torsional vibration. Consequently the following description on the present embodiment will be concentrated on such reinforcing members 134, 135, and other components are represented by same numbers as in FIGS. 22A and 22B and will not be explained further.

In the vicinity of the loops of the longitudinal and torsional vibrations generated in the elastic halves 115, 116, there are provided reinforcing members 134, 135 of a polymer material, having a width same as that of the piezoelectric elements 132, 133. The reinforcing members 134, 135 lack electroconductivity, and are incapable, unlike the ultrasonic actuator of the fifth embodiment, of detecting the state of the generated vibrations by converting the mechanical displacement into electrical energy.

Figure 1:
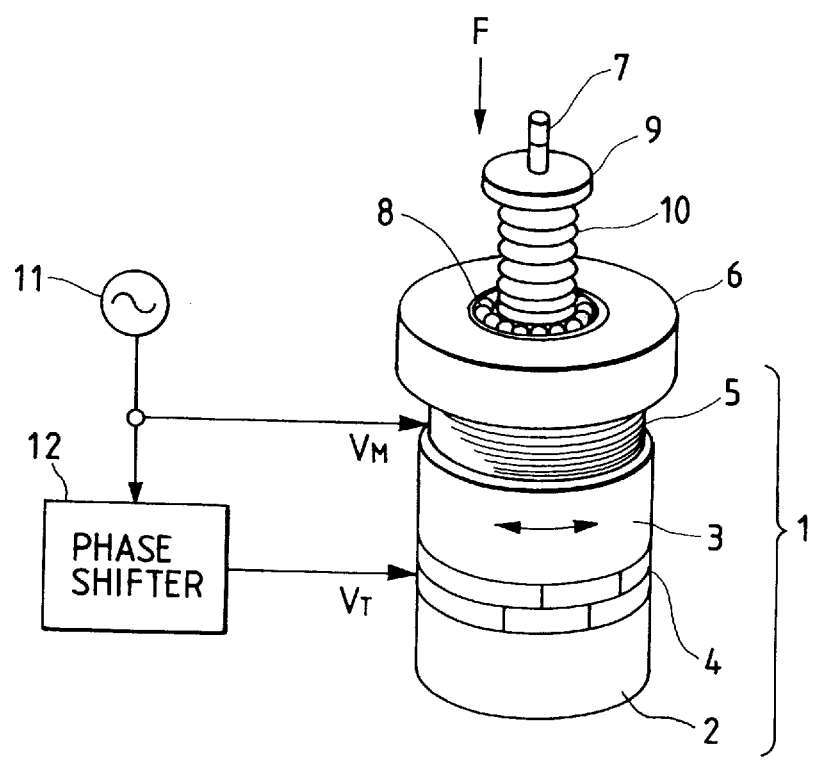
FIG. 1 is a perspective view of a conventional longitudinal-torsional vibration actuator.
Figure 2:
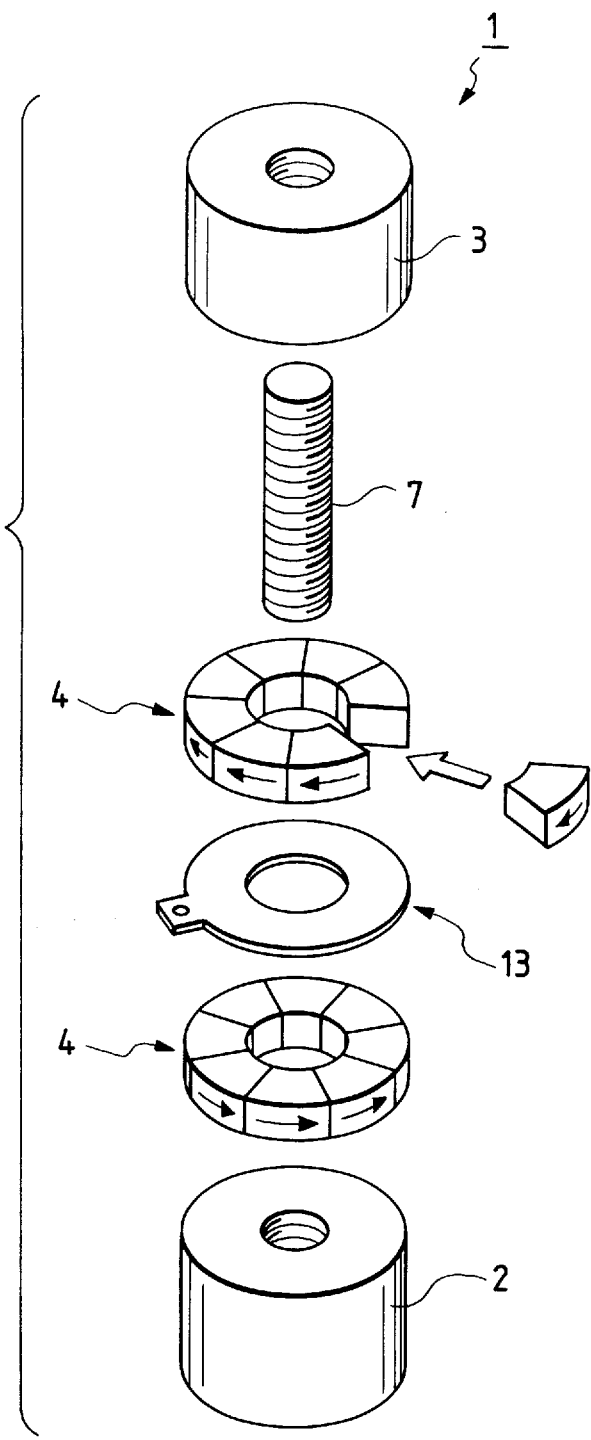
FIG. 2 is an exploded perspective view of a stator in the vibration actuator shown in FIG. 1.
Figure 3A:
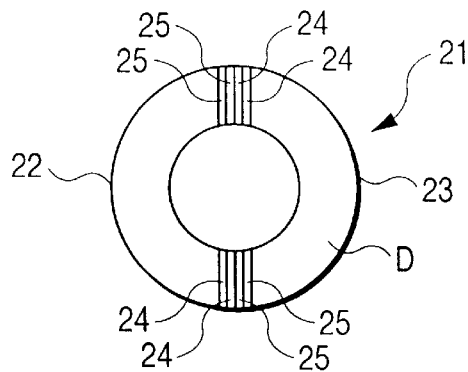
Figure 3B:
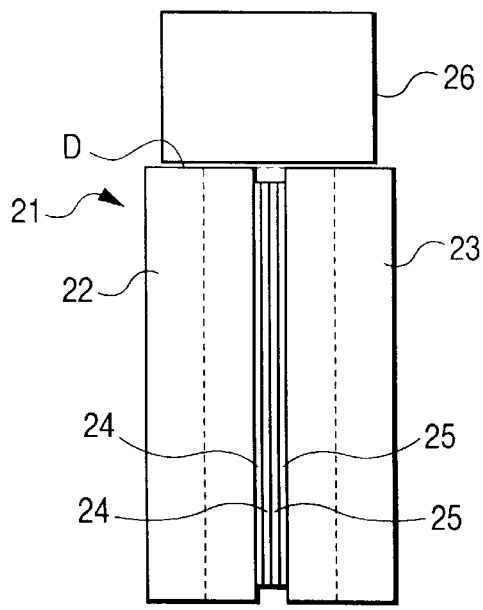
Figure 3C:
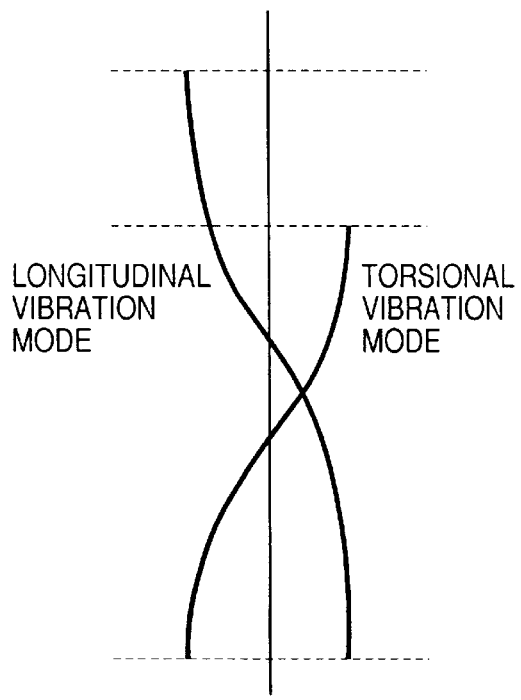
Figure 4A:
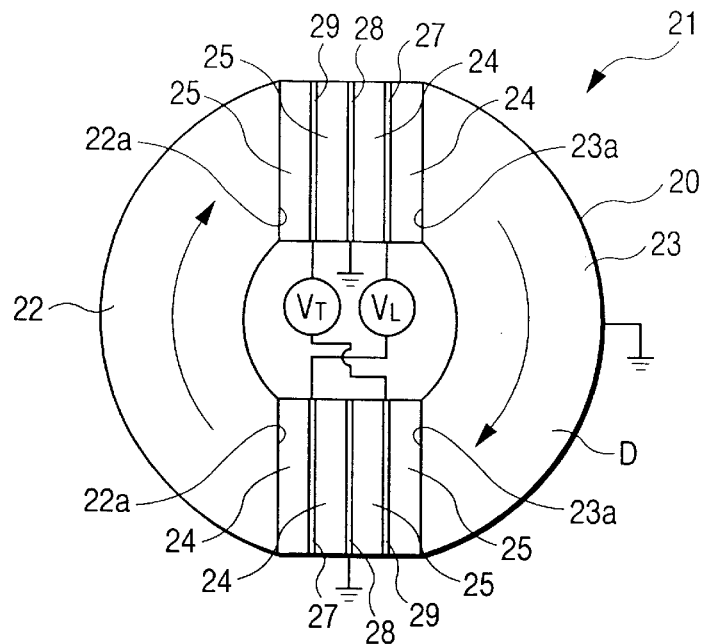
FIGS. 4A and 4B are respectively a plan view and a lateral view showing the details of a vibration element 21 in the vibration actuator proposed in the above-mentioned Japanese patent application.
Figure 4B:
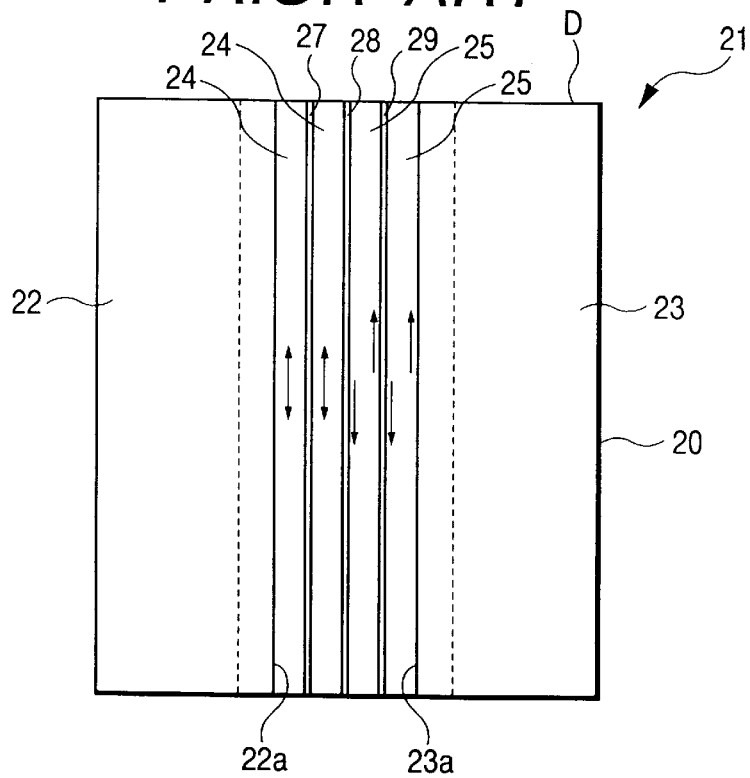
Figure 5A:
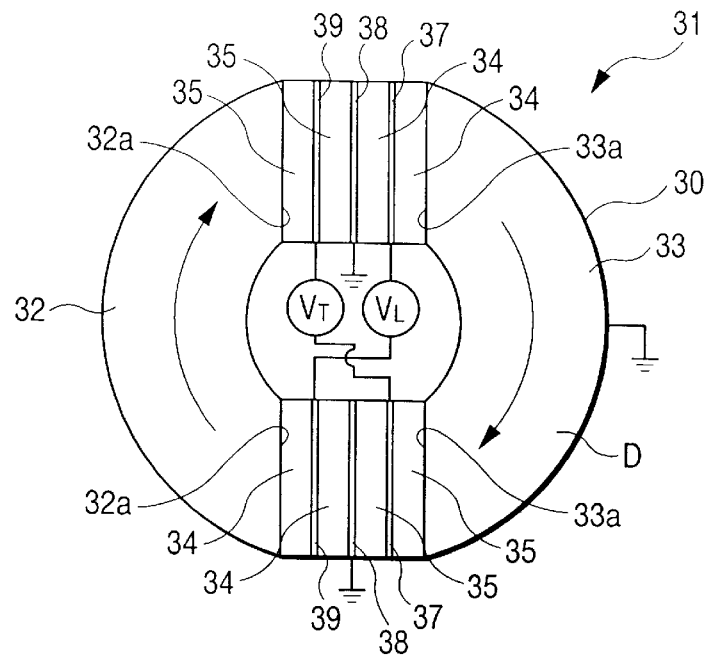
FIG. 5A is a plan view of a vibration actuator of different-mode degenerate type, to be employed in the vibration actuator.
Figure 5B:
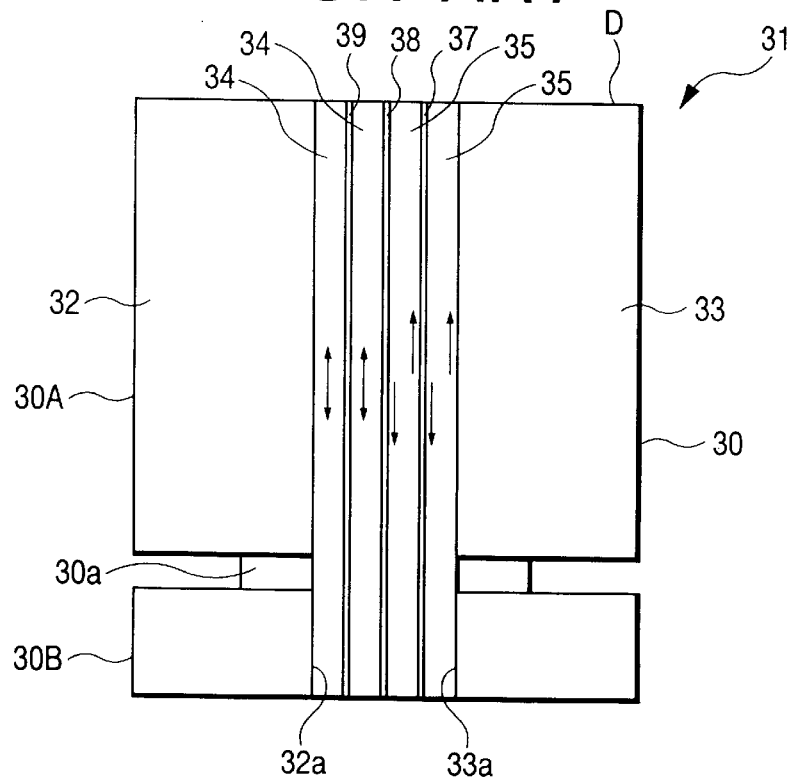
FIG. 5B is a lateral view of the vibration actuator shown in FIG. 5A.
Figure 6:
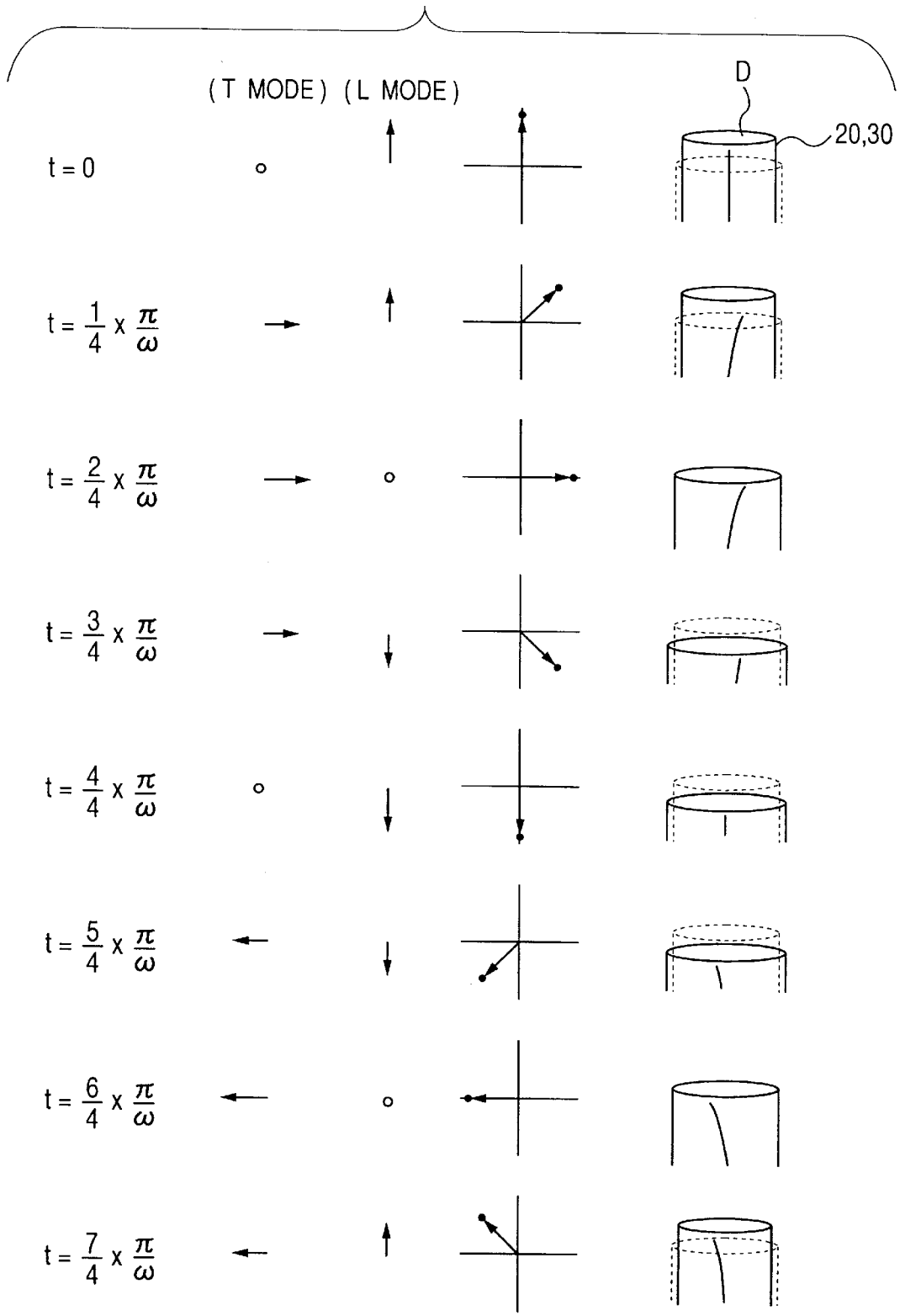
FIG. 6 is a view showing generation of elliptical movement, in time, on a driving face D by the combination of the torsional vibration (T-mode) and the longitudinal vibration (L-mode) generated in the vibration element shown in FIGS. 4A, 4B, 5A and 5B.

However, also in the ultrasonic actuator of the present embodiment, because of the presence of the reinforcing members 134, 135 between the elastic halves 115, 116, it is rendered possible to reduce the voltage applying area of the piezoelectric elements 132, 133, in comparison with the ultrasonic actuator shown in FIGS. 5A and 5B, thereby lowering the electrostatic capacitance of the piezoelectric elements 132, 133 and reducing the required input power.

As the reinforcing members 134, 135 are provided corresponding to the loops of the vibrations, not contributing much to the generation thereof, it is rendered possible to reduce the input electric power without sacrificing the output of the ultrasonic actuator, thereby improving the driving efficiency thereof.

Also in the ultrasonic actuator of the present embodiment, the presence of the reinforcing members 134, 135 sandwiched between the elastic halves 115, 116 improves the adhesion strength thereof and increase the durability of the ultrasonic actuator, in comparison with the case where a gap is formed instead of such reinforcing members.

[Variations]

In the foregoing embodiments, there have been explained ultrasonic actuators utilizing the ultrasonic vibration region, but the present invention is not limited to such region and is likewise applicable to the vibration actuators utilizing the vibrations of other regions.

Also in the foregoing embodiments, there have been explained ultrasonic actuators for obtaining a driving force by generating a second-order torsional vibration and a first-order longitudinal vibration in the elastic halves 115, 116. However the present invention is not limited to such embodiments but can achieve the effects thereof such as the improvement in the driving efficiency based on the reduction of the input electric power, in any vibration actuator provided with plural elastic members and electromechanical converting elements mounted on such plural elastic members and adapted to generate a longitudinal vibration of first or higher order in the axial direction of the elastic members and a torsional vibration of first or higher order by the application of drive voltage to the electromechanical converting elements, thereby generating a driving force.

In the foregoing embodiments, the elastic members are composed of steel, phosphor bronze or stainless steel, but they are preferably composed of a material with a higher resonance sharpness such as Elinvar, since such material increases the amplitude thereby improving the driving characteristics. The Elinvar, having a low temperature dependence of the resonance frequency, if used in the elastic members, reduces the temperature dependence of the performance of the ultrasonic actuator, thereby improving the controllability thereof.

Also in the foregoing embodiments, the piezoelectric elements are employed as the electromechanical or mechanoelectrical converting elements. However the present invention is not limited to such embodiments, but can employ any elements capable of mutual conversion of the electrical energy and the mechanical displacement. Examples of such elements, other than the piezoelectric element, include an electrostriction element and a magnetostriction element.

Also in the forgoing embodiment, the elastic member is assumed to be composed of two elastic halves, but the present invention is not limited to such embodiments and is likewise applicable to a case where the elastic member is composed of three or more elastic parts.

What is claimed is:

1. A vibration actuator, comprising:

a vibration element having an axis and including an elastic member and an electromechanical converting element; and a relative movement member to contact a driving face of said vibration elements, wherein the electromechanical converting element includes a longitudinal vibration generating electromechanical converting element to generate longitudinal vibration through displacement along the axial direction of said vibration element and a torsional vibration generating electromechanical converting element to generate torsional vibration through torsional displacement around the axis of said vibration element, and wherein the longitudinal and torsional vibration generating electromechanical converting elements are disposed along a substantially same plane in the axial direction of said vibration element, the longitudinal vibration generating electromechanical converting element includes a node of the longitudinal vibration, and the torsional vibration generating electromechanical converting element does not include the node of the longitudinal vibration.

2. A vibration actuator according to claim 1, wherein said longitudinal vibration generating electromechanical converting element is provided in a position including a node of said longitudinal vibration, and said torsional vibration generating electromechanical converting element is provided in a position including a node of said torsional vibration.

3. A vibration actuator according to claim 1, wherein said electromechanical converting elements are adhered to said elastic member, and the area of adhesion between said torsional vibration generating electromechanical converting element and said elastic member is smaller than that between said longitudinal vibration generating electromechanical converting element and said elastic member.

4. A vibration actuator, comprising:

a vibration element having an axis and including an elastic members, a first electromechanical converting element to generate a longitudinal vibration through displacement along the axial direction of said vibration element and a second electromechanical converting element to generate a torsional displacement about the axis of said vibration element;

a relative movement member to contact a driving face of said vibration element; and a mechanoelectrical converting element disposed within said vibration element along a plane in the axial direction and adapted to convert mechanical displacement into electrical energy, wherein the first electromechanical converting element includes a node of the longitudinal vibration and the second electromechanical converting element does not include the node of the longitudinal vibration.

5. A vibration actuator according to claim 4, wherein said vibration element is rod shaped, and said part of the vibration element is an end portion thereof along said axis of said vibration element.

6. A vibration actuator, comprising:

a vibration element having an axis and including an elastic member and an electromechanical converting element, wherein the electromechanical converting element has a first portion which generates a longitudinal vibration through displacement along the axial direction of said vibration element and a second portion which generates a torsional vibration through torsional displacement about the axis of said vibration element;

a relative movement member to contact a driving face of said vibration element; and a reinforcing member to reinforce said vibration element in a direction traverse to the axis of said vibration element, wherein said first portion, said second portion and said reinforcing member are disposed along a substantially same plane in the axial direction of said vibration element.

7. A vibration actuator according to claim 6, wherein said vibration element is rod shaped, and said part of the vibration element is an end portion thereof along said axis of said vibration element.

8. A vibration actuator, comprising:

a vibration element including an elastic member and an electromechanical converting element, wherein the electromechanical converting element has a first portion which generates a longitudinal vibration through displacement along an axial direction of said vibration element and a second portion which generates a torsional vibration through torsional displacement about the axis of said vibration element, and the elastic member includes a first part including a node of the longitudinal vibration and a second part not including the node of the longitudinal vibration;

a relative movement member to contact a driving face of said vibration element; and a reinforcing member to reinforce said vibration element in a direction traverse to the axis of said vibration element, wherein the second portion of said electromechanical converting element contacts the second part and not the first part of said elastic member, and said first portion, said second portion and said reinforcing member are disposed along a substantially same plane in the axial direction of said vibration element.

9. A vibration actuator according to claim 8, wherein the second part of the elastic member is both end parts of the elastic member in said axial direction thereof.

10. A vibration actuator according to claim 8, further comprising:

a mechanoelectrical converting element connected to the first part of the elastic member and adapted to convert a mechanical displacement into electrical energy.

11. A vibration actuator according to claim 8, wherein said longitudinal vibration is of first or higher order, and said torsional vibration is of first or higher order.

12. A vibration actuator, comprising:

an elastic member having a driving face;

a relative movement member to move relative to the driving face of said elastic member;

a longitudinal vibration element adhered to said elastic member to generate longitudinal vibration in said elastic member; and a torsional vibration element adhered to said elastic member to generate torsional vibration in said elastic member, wherein said longitudinal vibration element and said torsional vibration element are disposed along a substantially same plane in an axial direction of said elastic member, said longitudinal vibration element includes a node of the longitudinal vibration, and said torsional vibration element does not include the node of the longitudinal vibration.

13. A vibration actuator comprising:

an elastic member having a driving face;

a relative movement member to move relative to the driving face of said elastic member;

a longitudinal vibration element adhered to said elastic member to generate longitudinal vibration in said elastic member; and a torsional vibration element adhered to said elastic member to generate torsional vibration in said elastic member, wherein an area of adhesion between said torsional vibration element and said elastic member is smaller than an area of adhesion between said longitudinal vibration element and said elastic member, and said longitudinal vibration element and said torsional vibration element are disposed along a substantially same plane in an axial direction of said elastic member.

14. The vibration actuator according to claim 4, wherein:

said mechanoelectrical converting element is disposed in a position corresponding to a loop of said longitudinal or torsional vibration.

15. A vibration actuator, comprising:

a vibration element including first and second elastic members connected about an axis;

an electromechanical converting element affixed to said vibration element, the electromechanical converting element including a first portion which generates longitudinal vibration along the axis of said vibration element and a second portion which generates torsional vibration about the axis of said vibration element;

a relative movement member to contact a driving face of said vibration element; and a reinforcing member to reinforce the first and second elastic members in a direction traverse to a direction of the axis of said vibration element in a position corresponding to an antinode of the torsional vibration, wherein said first portion, said second portion and said reinforcing member are disposed along a substantially same plane in the axial direction of said vibration element.

16. The vibration actuator according to claim 8, wherein said electromechanical converting element is provided in a position corresponding to a node of said longitudinal or torsional vibration.

17. A vibration actuator, comprising:

a vibration element having an axis and including an elastic member and an electromechanical converting element; and a relative movement member to contact a driving face of said vibration element, wherein the electromechanical converting element includes a longitudinal vibration generating electromechanical converting element to generate longitudinal vibration through displacement along the axial direction of said vibration element, and a torsional vibration generating electromechanical converting element to generate torsional vibration through torsional displacement around the axis of said vibration element, and wherein the longitudinal vibration generating electromechanical converting element and the torsional vibration generating electromechanical converting element are disposed along a substantially same plane in the axial direction of said vibration element.

18. A vibration actuator, comprising:

a vibration element having an axis and including an elastic member and an electromechanical converting element; and a relative movement member to contact a driving face of said vibration element, wherein the electromechanical converting element includes a longitudinal vibration generating electromechanical converting element to generate longitudinal vibration through displacement along the axial direction of said vibration element, and a torsional vibration generating electromechanical converting element to generate torsional vibration through torsional displacement around the axis of said vibration element, and wherein the elastic member has a flat surface extending substantially parallel to the axial direction of said vibration element, and the longitudinal vibration generating electromechanical converting element and the torsional vibration generating electromechanical converting element are disposed adjacently on said flat surface of the elastic member.

19. A vibration actuator according to claim 18, wherein the elastic member comprises a first elastic member having a first side forming said flat surface and a second elastic member having a second side also forming said flat surface, and the longitudinal vibration generating electromechanical converting element and the torsional vibration generating electromechanical converting element are interposed between the first side and the second side.

* * * * *

UNITED STATES PATENT AND TRADEMARK OFFICE
CERTIFICATE OF CORRECTION

PATENT NO.: 5,892,316
DATED : April 6, 1999
INVENTOR(S): Takatoshi Ashizawa, et al.

It is certified that error appears in the above-identified patent and that said Letters Patent is hereby corrected as shown below:

On the title page, item [56]
OTHER PUBLICATIONS
--Sogo Denshi Shuppan, "Introduction to Ultrasonic Motor," pg. 81--.

FOREIGN PATENT DOCUMENTS, should be:
--8-103089 04/16/96 Japan Pat. Off.;
8-140377 05/31/96 Japan Pat. Off..--

Signed and Sealed this

Twenty-ninth Day of August, 2000

Attest:

Q. TODD DICKINSON

*Attesting Officer*  *Director of Patents and Trademarks*